(12) United States Patent
Kamo et al.

(10) Patent No.: US 10,354,764 B2
(45) Date of Patent: Jul. 16, 2019

(54) WELDING METHOD, REPAIRING METHOD, AND NUCLEAR REACTOR VESSEL

(71) Applicant: MITSUBISHI HEAVY INDUSTRIES, LTD., Tokyo (JP)

(72) Inventors: Kazuhiko Kamo, Tokyo (JP); Toshihide Nakano, Tokyo (JP); Takeshi Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 363 days.

(21) Appl. No.: 15/104,059

(22) PCT Filed: Feb. 24, 2014

(86) PCT No.: PCT/JP2014/054374
§ 371 (c)(1),
(2) Date: Jun. 13, 2016

(87) PCT Pub. No.: WO2015/107701
PCT Pub. Date: Jul. 23, 2015

(65) Prior Publication Data
US 2016/0314860 A1    Oct. 27, 2016

(30) Foreign Application Priority Data
Jan. 14, 2014  (JP) ................ 2014-004404

(51) Int. Cl.
| | | |
|---|---|---|
| *G21C 9/00* | (2006.01) | |
| *G21C 19/20* | (2006.01) | |
| *B23K 9/23* | (2006.01) | |
| *G21C 13/00* | (2006.01) | |
| *B23K 26/21* | (2014.01) | |
| *B23K 9/167* | (2006.01) | |
| *B23K 26/32* | (2014.01) | |
| *B23K 103/04* | (2006.01) | |

(52) U.S. Cl.
CPC ............ G21C 19/207 (2013.01); B23K 9/167 (2013.01); B23K 9/23 (2013.01); B23K 26/21 (2015.10); B23K 26/32 (2013.01); G21C 13/00 (2013.01); *B23K 2103/04* (2018.08); *Y02E 30/40* (2013.01)

(58) Field of Classification Search
CPC ....... G21C 3/334; G21C 19/207; G21C 19/40
See application file for complete search history.

(56) References Cited

U.S. PATENT DOCUMENTS 4,959,518 A   9/1990  Reynolds, Jr.

FOREIGN PATENT DOCUMENTS

| JP | 1-178375 A | 7/1989 |
|---|---|---|
| JP | 2-99280 A | 4/1990 |
| JP | 2-224873 A | 9/1990 |
| JP | 6-299233 A | 10/1994 |
| JP | 2000-246438 A | 9/2000 |

(Continued)

OTHER PUBLICATIONS

Extended Search Report dated Jul. 27, 2017, issued in counterpart European Application No. 14878943.1 (6 pages).

(Continued)

*Primary Examiner* — Marshall P O'Connor
(74) *Attorney, Agent, or Firm* — Westerman, Hattori, Daniels & Adrian, LLP

(57) ABSTRACT

A welding method includes welding a base material (1) of low alloy steel which is irradiated with neutrons using a welding material (2) of austenitic stainless steel.

2 Claims, 18 Drawing Sheets

(56) References Cited

FOREIGN PATENT DOCUMENTS

| JP | 2003-66183 | A | 3/2003 |
|----|------------|---|--------|
| JP | 2006-231403 | A | 9/2006 |
| JP | 2011-20134 | A | 2/2011 |
| JP | 2011-206809 | A | 10/2011 |
| JP | 2012-196686 | A | 10/2012 |
| RU | 2 443 530 | C1 | 2/2012 |

OTHER PUBLICATIONS

International Search Report dated Jun. 3, 2014, issued in counterpart International Application No. PCT/JP2014/054374, w/English translation (8 pages).
Written Opinion dated Jun. 3, 2014, issued in counterpart International Application No. PCT/JP2014/054374 in Japanese (7 pages).
Translation of Written Opinion dated Jun. 3, 2014, issued in counterpart International Application No. PCT/JP2014/054374. (9 pages).

POROSITY

| WELDING MATERIAL | MEASURED TEMPERATURE | SURFACE TENSION | GENERATION OF POROSITY |
|---|---|---|---|
| LOW ALLOY STEEL 2Ra | 1560°C | 1286mN/m | MANY |
| LOW ALLOY STEEL 2Rb | 1560°C | 1439mN/m | FEW |
| AUSTENITIC STAINLESS STEEL | 1600°C | 1530mN/m | NONE |

DEFECT

WELDING METHOD, REPAIRING METHOD, AND NUCLEAR REACTOR VESSEL

FIELD

The present invention relates to a welding method, a repairing method, and a nuclear reactor vessel.

BACKGROUND

As disclosed in Patent Literature 1, repairing of a structure may be carried out by welding.

CITATION LIST

Patent Literature

Patent Literature 1: Japanese Laid-open Patent Publication No. 2000-246438

SUMMARY

Technical Problem

For example, when robust welding is not performed in repairing a defect (primary defect) of a nuclear reactor vessel, a weld defect (secondary defect) may be caused. As a result, there is a possibility that repairing is not performed well and quality of the nuclear reactor vessel will degrade.

An object of some aspects of the present invention is to provide a welding method that can suppress generation of a weld defect and perform robust welding. Another object of some aspects of the present invention is to provide a repairing method that can repair a defect well. Another object of some aspects of the present invention is to provide a nuclear reactor vessel that can suppress degradation in quality.

Solution to Problem

According to a first aspect of the present invention a welding method comprises welding a base material of low alloy steel which is irradiated with neutrons using a welding material of austenitic stainless steel.

According to the first aspect of the present invention, when a base material of low alloy steel is welded, it is possible to suppress generation of a weld defect using austenitic stainless steel as a welding material. When the base material is irradiated with neutrons, there is a possibility that helium will be generated in the base material. When the base material including helium is welded, there is a possibility that porosities will be generated in the weld metal due to helium. According to knowledge of the inventor of the present invention, when a gas pressure of a molten metal is kept constant, porosities are likely to be generated with a small surface tension of the molten metal and are not likely to be generated with a large surface tension of the molten metal. The surface tension of austenitic stainless steel is larger than the surface tension of the low alloy steel. Accordingly, by welding the base material of low alloy steel irradiated with neutrons using the welding material of austenitic stainless steel, it is possible to suppress generation of a weld defect such as porosities.

In the first aspect of the present invention, the welding method may comprise: generating a weld metal of the base material and the welding material by the welding; measuring a dilution rate of the generated weld metal based on a prescribed heat input; determining a composition of the welding material based on the measured dilution rate and a target ferrite content of the weld metal; and welding the base material using the welding material having the determined composition.

Helium generated in melting the low alloy steel is contained in the weld metal of austenitic stainless steel. Accordingly, helium is collected at crystal gain boundaries in a welding heat cycle at the time of multi-layer multi-pass welding and grows as void defects to decrease high-temperature ductility. When the ferrite content in the weld metal decreases, the high-temperature ductility of the weld metal decreases and there is a possibility that a weld defect such as splits (cracks) will be generated in the weld metal. By performing the welding using the welding material having a composition determined based on the dilution rate and the target ferrite content, a weld metal including the target ferrite content is generated. Accordingly, it is possible to suppress generation of a weld defect.

In the first aspect of the present invention, the welding method may comprise: generating a weld metal of the base material and the welding material by the welding; setting a target ferrite content of the weld metal; determining a composition of the welding material so as to generate the weld metal having the target ferrite content at a first dilution rate of the weld metal and a second dilution rate other than the first dilution rate; and setting a heat input to achieve a dilution rate between the first dilution rate and the second dilution rate and welding the base material using the welding material having the determined composition.

Accordingly, it is possible to generate the weld metal having the target ferrite content and thus to suppress generation of a weld defect. Even when the dilution rate varies between the first dilution rate and the second dilution rate, it is possible to suppress generation of a weld defect.

In the first aspect of the present invention, the target ferrite may content of the weld metal ranges from 5% to 12%.

Accordingly, it is possible to suppress splits and deterioration in corrosion resistance of the weld metal and the like. When the ferrite content in the weld metal is less than 5%, there is a possibility that the weld metal will not have satisfactory ductility and a split will be generated. When the ferrite content in the weld metal is larger than 12%, other harmful effects such as deterioration in corrosion resistance of the weld metal may be caused. It is possible to suppress generation of harmful effects by adjusting the ferrite content in the weld metal to range from 5% to 12%.

According to a second aspect of the present invention, a repairing method comprises: detecting a defect of the base material which is irradiated with neutrons; and repairing the detected defect using the welding method according to any one of the first aspects above.

According to the second aspect of the present invention, since a defect (primary defect) of the base material is repaired using the welding method in which generation of the weld defect (secondary defect) is suppressed, it is possible to repair the base material well.

In the second aspect of the present invention, the repairing method may comprise removing a part of the base material including the defect. The welding of the base material includes welding a depressed portion which is formed in the base material by the removing, and the welding of the depressed portion includes filling up the depressed portion with the weld metal.

Accordingly, since the welding is performed to fill up the depressed portion formed in the base material by the removing after a defect of the base material is removed, it is possible to repair the defect of the base material well.

In the second aspect of the present invention, the welding may include welding a clad layer of austenitic stainless steel formed on the surface of the base material, the removing includes removing a part of the clad layer, the welding of the clad layer includes welding an opening which is formed in the clad layer by the removing, and the welding of the opening includes filling up the opening with the weld metal.

Accordingly, when a defect is generated in the base material, the base material and the clad layer can be repaired well by welding the depressed portion and the opening after a part of the base material and a part of the clad layer are removed.

In the second aspect of the present invention, the repairing method may comprise: welding the depressed portion with a first heat input such that the weld metal does not come in contact with the clad layer; and welding the opening with a second heat input smaller than the first heat input after welding the depressed portion.

Accordingly, it is possible to suppress generation of a weld defect and to shorten a welding operation time. The clad layer is formed by welding and includes a heat-affected zone. There is a possibility that the clad layer will include helium by irradiation with neutrons. Accordingly, when the welding material (weld metal) comes in contact with the clad layer, there is a possibility that a weld defect such as splits will be generated. By welding the opening of the clad layer with the second heat input smaller than the first heat input, it is possible to suppress generation of the weld defect. By welding the depressed portion of the base material with the first heat input larger than the second heat input, it is possible to shorten a welding operation time.

In the second aspect of the present invention, the repairing method may comprise: welding the depressed portion and the opening with a third heat input; removing the weld metal of the opening and a part of the clad layer around the opening in a state in which the weld metal in the depressed portion remains after the welding of the depressed portion and the welding of the opening; and welding a second opening which is formed in the clad layer by the removing with a fourth heat input smaller than the third heat input.

Accordingly, it is possible to suppress generation of a weld defect and to shorten a welding operation time. By welding the depressed portion and the opening with the third heat input larger than the fourth heat input, it is possible to shorten a welding operation time. Even when a weld defect is generated in a part of the clad layer around the opening due to the welding, the weld defect is removed along with a part of the clad layer by removing a part of the clad layer around the opening. Since the second opening formed in the clad layer is welded with the fourth heat input smaller than the third heat input, it is possible to suppress generation of a weld defect.

In the second aspect of the present invention, the repairing method may 1 comprise: disposing a plug member in the depressed portion before the welding of the depressed portion and the welding of the opening after the depressed portion is formed; welding the opening with a fifth heat input in a state in which the plug member is disposed in the depressed portion; removing a part of the weld metal of the opening to form a third opening in the weld metal after the welding of the opening; removing the plug member from the depressed portion; and welding the depressed portion and the third opening with a sixth heat input larger than the fifth heat input after the forming of the third opening and the removing of the plug member.

Accordingly, it is possible to suppress generation of a weld defect and to shorten a welding operation time. By welding the opening of the clad layer with the fifth heat input smaller than the sixth heat input, it is possible to suppress generation of a weld defect. Since the plug member is disposed in the depressed portion in welding the opening, the opening is welded and the depressed portion is not welded. Accordingly, it is possible to shorten a welding operation time. The weld metal defining the third opening is a robust weld zone in which generation of a weld defect is suppressed. Since the depressed portion and the third opening are welded with the sixth heat input larger than the fifth heat input after the third opening is formed and the plug member is removed, it is possible to shorten a welding operation time.

In the second aspect of the present invention, the repairing method may comprise covering the opening with a cover member before the welding after the forming of the depressed portion and the opening.

Accordingly, since the opening is covered with the cover member before the welding for repairing is performed after the depressed portion and the opening are formed to remove a defect of the base material, it is possible to suppress deterioration of the base material. For example, when a sufficient repairing operation time is not secured, temporary repairing is performed by the cover member.

In the second aspect of the present invention, the cover member may include austenitic stainless steel, and at least a part of the cover member and the clad layer is welded using the welding material.

Accordingly, it is possible to smoothly bond the cover member to the clad layer.

According to a third aspect of the present invention, a nuclear reactor vessel comprises a base material of low alloy steel which is irradiated with neutrons. The base material is repaired using the repairing method according to any one of the second aspect above.

According to the third aspect of the present invention, since the defect is repaired well, it is possible to suppress degradation in quality of the nuclear reactor vessel.

According to a fourth aspect of the present invention, a nuclear reactor vessel comprises: a base material of low alloy steel which is irradiated with neutrons; and a weld zone that is disposed in the base material and includes a weld metal of the base material and a welding material of austenitic stainless steel.

According to the fourth aspect of the present invention, since a defect is repaired well, it is possible to suppress degradation in quality of the nuclear reactor vessel.

Advantageous Effects of Invention

According to the welding method of the present invention, it is possible to suppress generation of a weld defect and to perform robust welding. According to the repairing method of the present invention, it is possible to repair a base material well. According to the nuclear reactor vessel of the present invention, it is possible to suppress degradation in quality.

DESCRIPTION OF EMBODIMENTS

Hereinafter, embodiments of the present invention will be described with reference to the accompanying drawings, but the present invention is not limited to the embodiments. Requirements of the embodiments to be described below can be appropriately combined. Some elements may not be utilized.

First Embodiment

Figure 1:
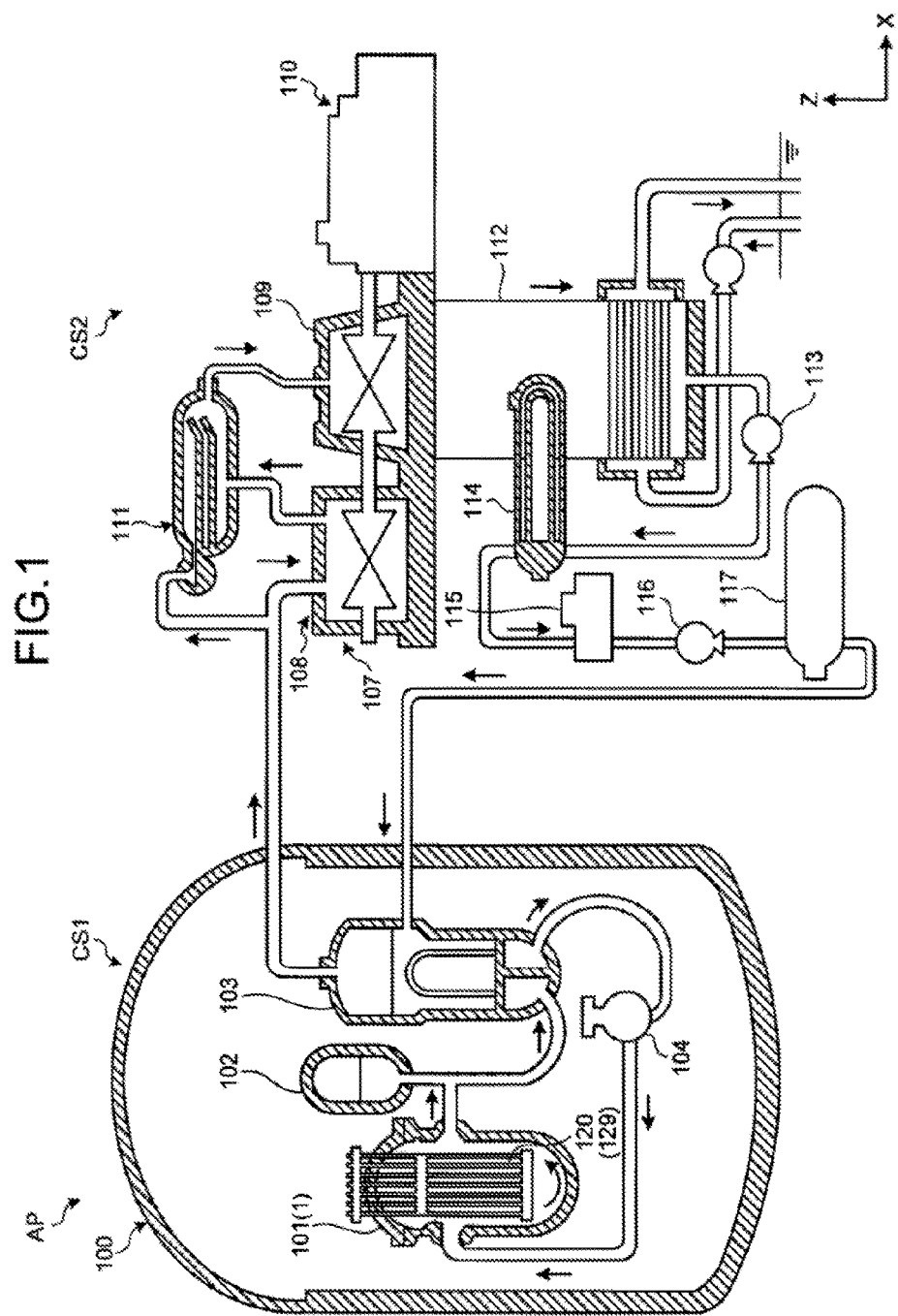
FIG. 1 is a schematic configuration diagram illustrating an example of a power generation plant according to a first embodiment.

A first embodiment will be described below. FIG. 1 is a schematic configuration diagram illustrating an example of an atomic power generation plant AP according to this embodiment. As illustrated in FIG. 1, the atomic power generation plant AP includes a nuclear reactor system CS1 and a turbine system CS2. In this embodiment, the atomic power generation plant AP includes a pressurized water reactor (PWR). A primary coolant circulates in the nuclear reactor system CS1. A secondary coolant circulates in the turbine system CS2. The nuclear reactor system CS1 generates a high-temperature and high-pressure primary coolant (hot water). The atomic power generation plant AP includes a steam generator 103. In the steam generator 103, the primary coolant (hot water) and the second coolant exchange heat to generate steam of the secondary coolant.

The nuclear reactor system CS1 includes a nuclear reactor vessel 101, a pressurizer 102, and a primary coolant pump 104. The nuclear reactor vessel 101, the pressurizer 102, the steam generator 103, and the primary coolant pump 104 are received in a containment 100. The nuclear reactor vessel 101 contains a reactor internal 129 and a fuel assembly 120. The high-temperature and high-pressure primary coolant (hot water) which has been heated by the nuclear reactor vessel 101 and pressurized by the pressurizer 102 is supplied to the steam generator 103. The low-temperature primary coolant which has been heat-exchanged by the steam generator 103 is supplied to the nuclear reactor vessel 101.

The turbine system CS2 includes a steam turbine 107 that has a high-pressure turbine 108 and a low-pressure turbine 109, a power generator 110 that is driven to generate power by the steam turbine 107, a moisture separator and heater 111, a condenser 112 that cools and liquefies steam having worked in the steam turbine 107, a feed pump 116, a condensing pump 113, a low-pressure feed water heater 114, a deaerator 115, and a high-pressure feed water heater 117. The steam turbine 107 is driven by steam supplied from the steam generator 103. The condenser 112 cools steam by using, for example, seawater to return the steam to water. The feed pump 116 operates to feed the second coolant from the condenser 112 to the steam generator 103.

The nuclear reactor vessel 101 is formed of carbon steel or low alloy steel. In this embodiment, the nuclear reactor vessel 101 includes a member of low alloy steel.

When a defect (primary defect) of the nuclear reactor vessel 101 is detected as a result of inspection of the activated nuclear reactor vessel 101, repairing of the defect is performed. The defect includes splits (cracks) which are generated in at least a part of the nuclear reactor vessel 101. In this embodiment, the defect generated in the nuclear reactor vessel 101 is repaired by welding.

In the following description, a repair target member to be repaired by welding is appropriately referred to as a base material 1. The base material 1 includes a base material of the nuclear reactor vessel 101. The base material 1 includes a weld zone welded in advance to the base material. The base material 1 is low alloy steel. In activating the nuclear reactor vessel 101, the base material 1 of the nuclear reactor vessel 101 is irradiated with neutrons.

An example of a method of repairing of the base material 1 according to this embodiment will be described below.

Figure 2:
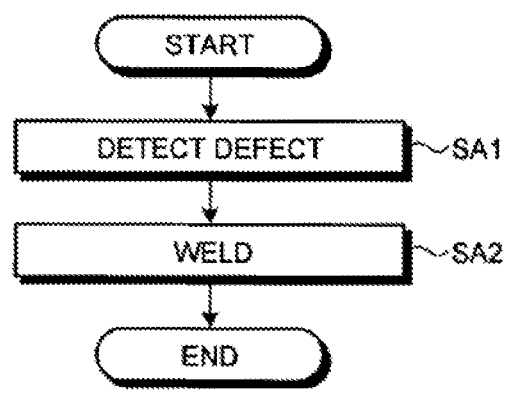
FIG. 2 is a flowchart illustrating an example of a repairing method according to the first embodiment.

FIG. 2 is a flowchart illustrating an example of the method of repairing the base material 1 according to this embodiment. As illustrated in FIG. 2, the repairing method according to this embodiment includes a step (step SA1) of detecting a defect of the base material 1 irradiated with neutrons and a step (step SA2) of repairing the detected defect by welding.

Figure 3:
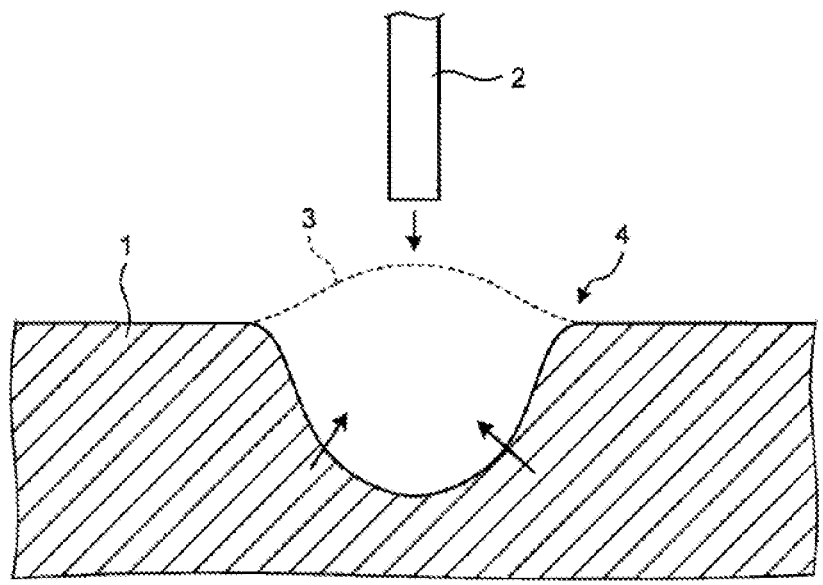
FIG. 3 is a schematic diagram illustrating an example of a process of repairing a defect of a base material by welding according to the first embodiment.

FIG. 3 is a schematic diagram illustrating an example of a process of repairing a defect of the base material 1 by welding. In this embodiment, the welding of step SA2 includes welding the base material 1 of low alloy steel irradiated with neutrons using a welding material 2 of austenitic stainless steel. As illustrated in FIG. 3, when the base material 1 is welded using the welding material 2, a weld metal 3 of the base material 1 and the welding material 2 is generated by the welding. The weld metal 3 means a metal which is molten and solidified during welding in a part of a weld zone 4. That is, the weld metal 3 includes the molten and solidified base material 1 and the molten and solidified welding material 2. The weld zone 4 is a generic term of a part including the weld metal 3 and a heat-affected zone. By welding the base material 1 using the welding material 2, the weld zone 4 including the weld metal 3 of the base material 1 and the welding material 2 is formed in the base material 1.

Alloy steel means steel containing iron as a major component and containing Al (0.1 mass %), B (0.0008 mass %), Co (0.1 mass %), Cr (0.3 mass %), Cu (0.4 mass %), La (0.05 mass %), Mo (0.08 mass %), Nb (0.06 mass %), Ni (0.3 mass %), Pb (0.4 mass %), Se (0.1 mass %), Te (0.1 mass %), Ti (0.05 mass %), V (0.1 mass %), W (0.1 mass %), and Zr (0.05 mass %) in addition to Fe and C (wherein numerical values in parentheses are lower limit values). Low alloy steel means alloy steel in which the total content of the above-mentioned alloy elements is equal to or less than 5 mass %.

The austenitic stainless steel means stainless steel exhibiting an austenite structure even at a room temperature and containing chromium (Cr) and nickel (Ni). The austenitic stainless steel is solidified by only cold working and is not solidified but softened by heat treatment. The austenitic stainless steel is more excellent in mechanical characteristics and weldability than ferritic stainless steel.

When the base material 1 is irradiated with neutrons, there is a possibility that the quality of the base material 1 will vary. The variation in quality of the material due to irradiation with neutrons includes one or both of generation of helium and a decrease in ductility. When the base material 1 having varied in quality of the material is welded, there is a possibility that a weld defect (secondary defect) will be generated. The weld defect includes one or both of porosities and cracks. The porosities result from, for example, generation of helium. The cracks result from, for example, the decrease in ductility.

For example, when helium is generated in the base material 1 and the base material 1 including helium is welded, there is a possibility that porosities will be generated in the weld metal 3. The porosity is a kind of weld defect and is a generic term of a blowhole formed in the solidified weld metal 3 and a pit opened to the surface due to gas generated in the molten metal. In this embodiment, the porosity includes pores generated in the weld metal 3 in a boundary with the base material 1.

According to the knowledge of the inventor of the present invention, when the same material (low alloy steel in this embodiment) as the base material 1 is used as the welding material 2 in repairing a defect (primary defect) of the base material 1 including helium by welding, the possibility that plural porosities (secondary defects) will be generated becomes higher.

There is a possibility that generation of porosities will be suppressed by suppressing a heat input. However, when a heat input is suppressed, extension of a welding operation time for forming a desired weld zone 4 is caused. The heat input (heat input) means an amount of heat applied to the weld zone 4 from the outside in the welding operation and is inversely proportional to a welding speed. The welding speed means a speed at which a weld bead is put in the welding operation and means a bead length per unit time.

When the base material 1 of low alloy steel is welded, it is possible to suppress generation of porosities using austenitic stainless steel as the welding material 2. According to knowledge of the inventor of the present invention, when the gas pressure of the molten metal is kept constant, porosities are likely to be generated with a small surface tension of molten metal and are not likely to be generated with a large surface tension of the molten metal.

Expression (1) represents a condition of generating porosities. As represented by Expression (1), when the gas pressure of molten metal is kept constant, porosities are more likely to be generated with a smaller surface tension of the molten metal.

$$P_{CO} + P_{H_2} + P_{N_2} + P_{He} + \ldots \geqq 1 + \alpha + 9.87 \times 10^{-7} \times \frac{2\gamma}{R} \quad (1)$$

$P_{CO}$, $P_{H_2}$, $P_{N_2}$, $P_{He}$: gas generated pressures in solidification (atm)

α: constant pressure of molten metal

β: surface tension of molten metal

R: radius of porosity (pore)

The surface tension of austenitic stainless steel is larger than the surface tension of low alloy steel. Accordingly, it is possible to suppress generation of porosities in the weld metal 3 by using austenitic stainless steel as the welding material 2.

Figure 4:
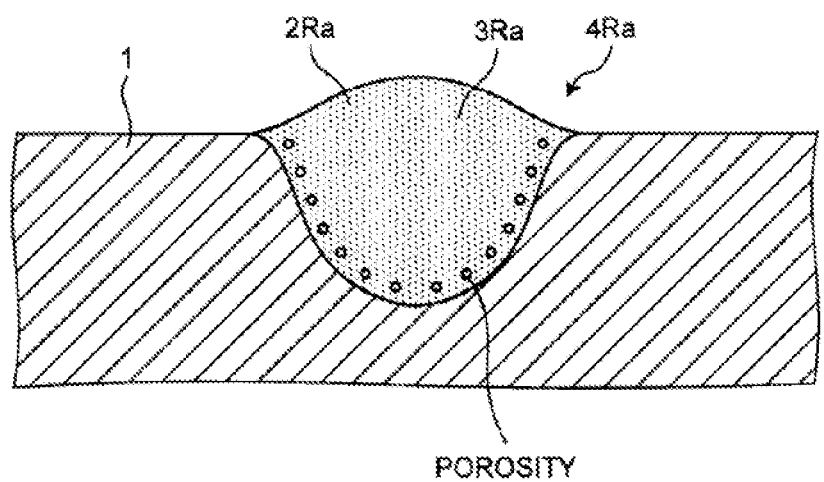
FIG. 4 is a schematic diagram illustrating an example of a state of a weld zone after a defect in the base material is repaired by welding.
Figure 5:
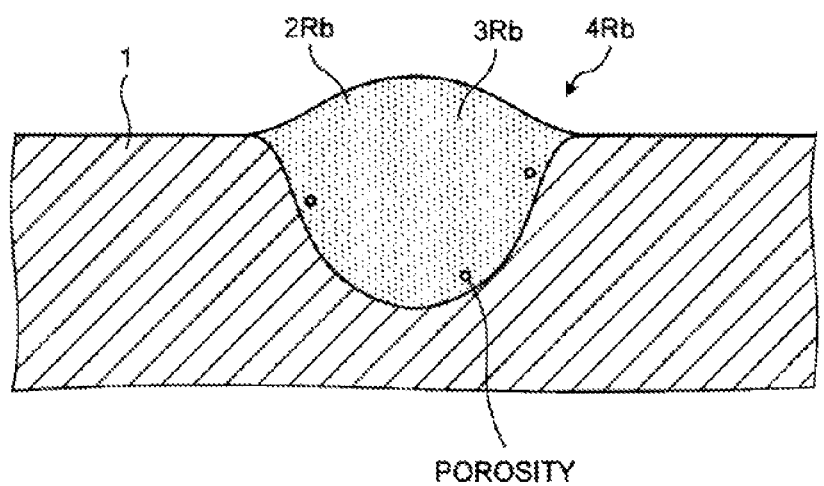
FIG. 5 is a schematic diagram illustrating an example of a state of a weld zone after a defect in the base material is repaired by welding.
Figure 6:
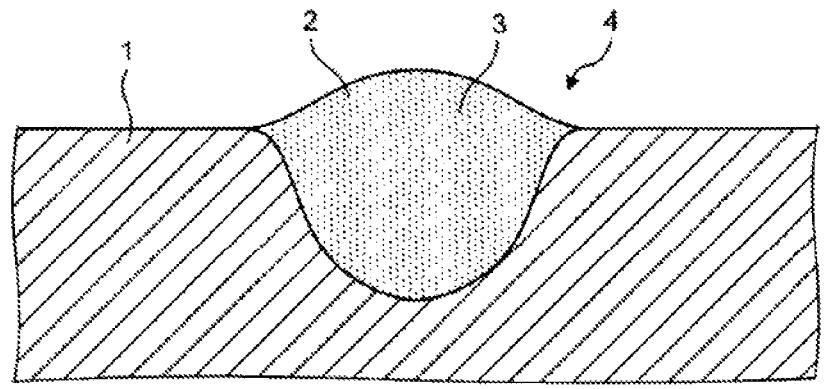
FIG. 6 is a schematic diagram illustrating an example of a state of a weld zone after a defect in the base material is repaired by welding according to the first embodiment.

FIGS. 4, 5, and 6 are schematic diagrams illustrating examples of a weld zone after a defect (primary defect) generated in the base material 1 of low alloy steel is repaired by welding. The welding for repairing includes butteredwelding at least a part of the base material 1 using a welding material. FIG. 4 illustrates an example of a weld zone 4Ra when the same low alloy steel 2Ra as the base material 1 is used as the welding material. FIG. 5 illustrates an example of a weld zone 4Rb when low alloy steel 2Rb having a surface tension larger than that of the base material 1 is used as the welding material. FIG. 6 illustrates an example of a weld zone 4 when austenitic stainless steel 2 is used as the welding material.

The base material 1 is low alloy steel having been irradiated with neutrons. FIGS. 4, 5, and 6 illustrate a weld zone which is formed in a first pass (welding operation).

Figures 7, 8:
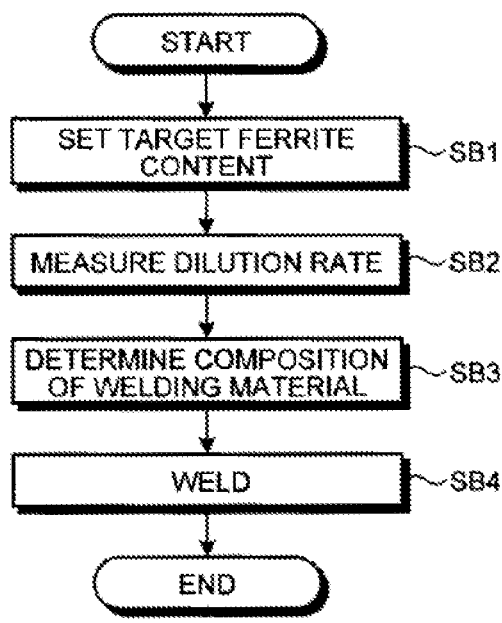
FIG. 7 is a diagram illustrating a relationship between a surface tension of a welding material and generation of porosities.
FIG. 8 is a flowchart illustrating an example of a welding method according to a second embodiment.

FIG. 7 is a diagram illustrating a relationship between measurement results of the surface tensions of the low alloy steel 2Ra (the same kind of low alloy steel as the base material. 1), the low alloy steel 2Rb having a surface tension larger than that of the low alloy steel 2Ra, and the austenitic stainless steel 2 and generation of porosities. In this embodiment, the austenitic stainless steel 2 is SUS304. As illustrated in FIG. 7, the surface tension of the low alloy steel 2Ra at 1560° C. is 1286 mN/r. The surface tension of the low alloy steel 2Rb at 1560° C. is 1439 mN/m. The surface tension of the austenitic stainless steel 2 at 1600° C. is 1530 mN/m.

As illustrated in FIGS. 4 and 7, when the low alloy steel 2Ra is used as the welding material, plural porosities are generated in a weld metal 3Ra in the vicinity of the boundary with the base material 1.

As illustrated in FIGS. 5 and 7, when the low alloy steel 2Rb is used as the welding material, slight porosities are generated in a weld metal 3Rb in the vicinity of the boundary with the base material 1.

As illustrated in FIGS. 6 and 7, when the austenitic stainless steel 2 having a large surface tension is used as the welding material, no porosity is generated.

In this way, when a defect of the base material 1 irradiated with neutrons is repaired by welding, it is possible to suppress generation of porosities using the welding material 2 having a large surface tension. From this test result, it can be confirmed that it is possible to suppress generation of porosities using the welding material 2 having a surface tension of 1400 mN/m or more at 1560° C. which is the melting temperature of the base material 1.

A defect of the base material 1 not irradiated with neutrons was repaired by welding using the low alloy steel 2Ra, the low alloy steel 2Rb, and the austenitic stainless steel 2 as the welding material. As a result, even when any one of the low alloy steel 2Ra, the low alloy steel 2Rb, and the austenitic stainless steel 2 is used, no porosity was generated. Accordingly, it can be confirmed that one cause of porosities due to welding is irradiation of the base material 1 with neutrons (generation of helium due to irradiation with neutrons).

As described above, according to this embodiment, when a defect of the base material 1 of low alloy steel is repaired by welding, it is possible to suppress generation of porosities using the austenitic stainless steel as the welding material 2. Accordingly, it is possible to perform robust welding and to repair the base material 1 well. When the base material 1 is the base material of the nuclear reactor vessel 101, it is possible to suppress degradation in quality of the nuclear reactor vessel 101.

For example, the porosities are classified into a first type in "defect type" of Table 1 in Annex 4 of Annex 4 "defect image classification method using radiograph" of JIS Z 3104 "Methods of radiographic examination for welded joints in steel." The "size of test field of vision" is defined in Table 2 of Annex 4, and the "number of defects" is defined in Table 3 of Annex 4. Determination of whether to be accepted as a first type of defect is performed in accordance with the criterion of Table 5 of Annex 4. In this embodiment, it is possible to satisfy the criterion of this standard using austenitic stainless steel as the welding material.

Second Embodiment

A second embodiment will be described below. In the following description, elements equal or equivalent to those of the above-mentioned embodiment will be referenced by the same reference signs and description thereof will be described in brief or omitted.

The above-embodiment describes an example in which generation of porosities is suppressed. A weld defect includes splits (cracks). In this embodiment, an example in which generation of splits (solidification cracks, hot cracks) of the weld metal 3 is suppressed will be described.

There is a possibility that splits are generated in the weld metal 3 (weld zone 4). One cause of generation of splits is a decrease in ductility of the weld metal 3. Particularly, there is a possibility that a split will be generated in the weld metal 3 which is produced in a first pass (welding operation).

When the base material 1 irradiated with neutrons is welded using the welding material 2, there is a high possibility that a split will be generated due to helium included in the base material 1. For example, it is considered that helium is diffused into a crystal grain boundary (solidification structure boundary) of the weld metal 3 to form bubbles and thus the ductility of the weld metal 3 decreases to generate a split. When a bubble is formed in the first pass, it can also be considered that the bubble grows by welding heat in a second pass and thus the grain boundary strength decreases to decrease the ductility of the weld metal 3.

According to knowledge of the inventor of the present invention, when a ferrite content in the weld metal 3 is small, the ductility of the weld metal 3 decreases and a split is likely to be generated. When the ferrite content in the weld metal 3 is large, the ductility of the weld metal 3 is improved and a split is not likely to be generated. The ferrite content means a content of a ferrite structure included in the weld metal 3.

Therefore, in this embodiment, in order to suppress generation of a split in the weld metal 3, the ferrite content in the weld metal 3 is adjusted to a target value (target ferrite content). In this embodiment, the target ferrite content in the weld metal 3 ranges from 5% to 12%. When the ferrite content in the weld metal 3 is less than 5%, there is a possibility that the weld metal 3 will not have satisfactory ductility and a split will be generated. When the ferrite content in the weld metal 3 is more than 12%, another harmful effect such as deterioration in corrosion resistance of the weld metal 3 may be caused. Accordingly, in this embodiment, the ferrite content in the weld metal 3 is adjusted to range from 5% to 12%.

It is possible to suppress generation of a split in the weld metal 3 by suppressing a heat input. In this embodiment, in order to suppress generation of a split in the weld metal 3, a heat input is sufficiently reduced. In this embodiment, the welding is performed using TIG welding or laser welding in which a heat input is reduced. In the following description, a heat input which is sufficiently reduced to suppress generation of a split in the weld metal 3 is appropriately referred to as a prescribed heat input.

An example of the welding method according to this embodiment will be described below. FIG. 8 is a flowchart illustrating an example of the method of welding a base material 1 according to this embodiment. As illustrated in FIG. 8, the welding method according to this embodiment includes a step (step SB1) of setting a target ferrite content in the weld metal 3, a step (step SB2) of measuring a dilution rate of the weld metal 3 which is generated by the base material 1 and the welding material 2 with the prescribed heat input, a step (step SB3) of determining a composition of the welding material 2 based on the measured dilution rate and the target ferrite content, and a step (step SB4) of welding the base material 1 using the welding material 2 having the determined composition.

The target ferrite content in the weld metal 3 is set (step SB1). As described above, in this embodiment, the target ferrite content in the weld metal 3 ranges from 5% to 12%.

The dilution rate of the weld metal 3 which is generated by the base material 1 and the welding material 2 with the prescribed heat input is measured (step SB2). Dilution means a phenomenon in which the welding material 2 is thinned by the molten base material 1 and an alloy component of the weld metal 3 is smaller than the alloy component of the welding material 2. The dilution rate means a degree by which the welding material 2 is thinned by the base material 1 and is defined by Expression (2)

$$P = \frac{A}{A+B} \times 100[\%] \quad (2)$$

P: dilution rate
A: an amount of welding material included in the weld metal
B: an amount of base material included in the weld metal When the dilution rate is low, the composition of the weld metal 3 is close to the composition of the welding material 2 (ferritic stainless steel). When the dilution rate is high, the composition of the weld metal 3 gets close to the composition of the base material 1 (low alloy steel). When the heat input is reduced in welding, an amount of welding material 2 fed decreases and thus the dilution rate increases. When the heat input is small, the dilution rate ranges, for example, from 30% to 50%. When the heat input is large, the dilution rate is, for example, about 10%.

When the base material 1 is welded using the welding material 2 in n passes, the value of an X component of the weld metal 3 of an n-th layer is expressed by Expression (3)

$$X_n = x + \left(\frac{P}{100}\right)^n (y - x) \quad (3)$$

$X_n$: value of an X component of the weld metal of the n–th layer
x: value of an X component of the welding material
y: value of an X component of the base material Then, the process of determining the composition of the welding material 2 is performed based on the dilution rate measured in step SB2 and the target ferrite content of the weld metal 3 set in step SB1. In this embodiment, the process of determining the composition of the welding material 2 is performed using a Schaeffler's diagram.

Figure 9:
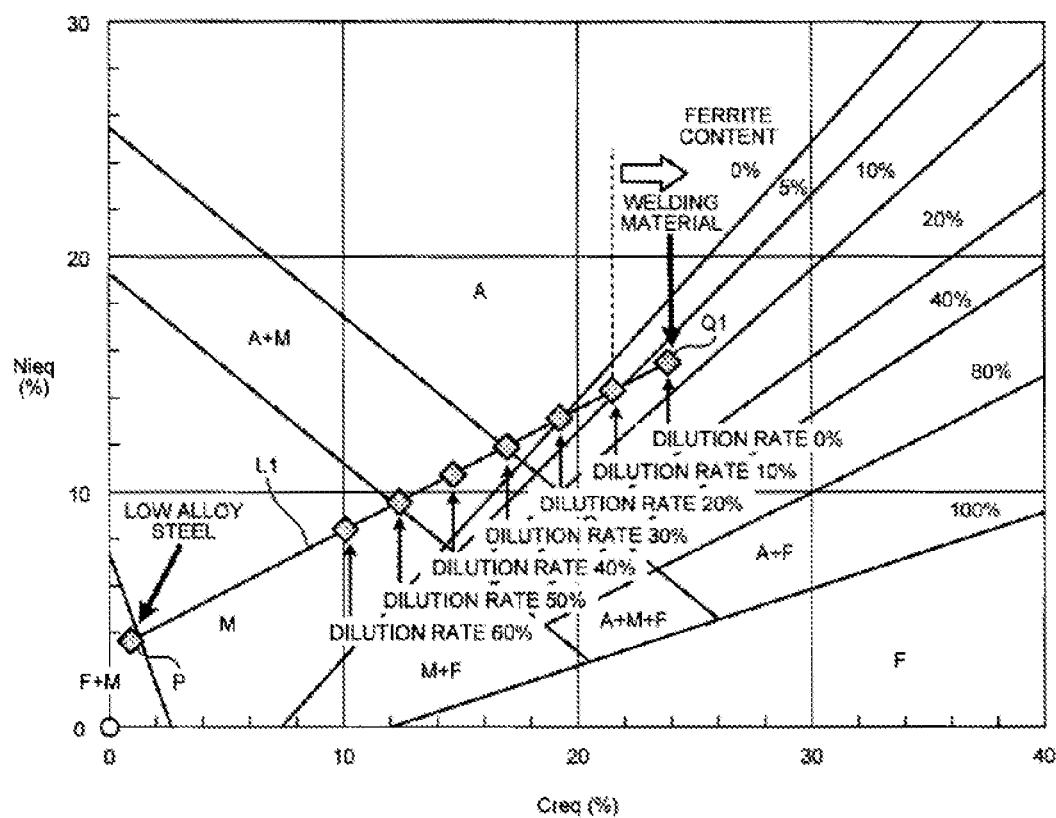
FIG. 9 is a diagram illustrating an example of a Schaeffler's diagram.

FIG. 9 illustrates an example of a Schaeffler's diagram. The Schaeffler's diagram is used as a method of estimating the ferrite content in the weld metal 3 from the alloy component. FIG. 9 illustrates an example in which the welding material 2 is existing austenitic stainless steel (for example, Y308L). In FIG. 9, a line L1 is a line connecting a point P indicating the composition (a chromium equivalent and a nickel equivalent) of the low alloy steel as the base material 1 to a point Q1 indicating the composition (a chromium equivalent and a nickel equivalent) of the austenitic stainless steel as the welding material 2. The composition (a chromium equivalent and a nickel equivalent) of the weld metal 3 which is generated by welding the base material 1 and the welding material 2 is present on the line L1. The point indicating the composition of the weld metal 3 moves along the line L1 with the variation in dilution rate. When the dilution rate is low, the composition of the weld metal 3 gets close to the composition of the welding material 2. When the dilution rate is high, the composition of the weld metal 3 gets close to the composition of the base material 1.

When the dilution rate is low, the composition of the weld metal 3 is placed in a mixture area (A+F) of austenite (A) and ferrite (F) which is close to the composition of the welding material 2. With an increase in dilution rate, the composition of the weld metal 3 varies to the mixture area of austenite (A) and martensite (M) via the single-phase area of austenite (A).

In FIG. 9, the chromium equivalent of the welding material 2 (the weld metal 3 at a dilution rate of 0%) is about 24%, and the nickel equivalent is about 16%. From Expression (3), at a dilution rate of 10%, the chromium equivalent of the weld metal 3 of the first layer is about 21.6% and the nickel equivalent is about 14.4%. At a dilution rate of 20%, the chromium equivalent of the first layer is about 19.2% and the nickel equivalent is about 12.8%.

In the example illustrated in FIG. 9, when the dilution rate is higher than 10%, the ferrite content in the weld metal 3 is lower than 5%. Accordingly, in order to achieve the above-mentioned target value of ferrite content (from 5% to 12%), the dilution rate needs to be equal to or less than 10%. That is, in order to achieve the target ferrite content using the welding material 2 illustrated in FIG. 9, it is necessary to set the heat input to be large.

Figure 10:
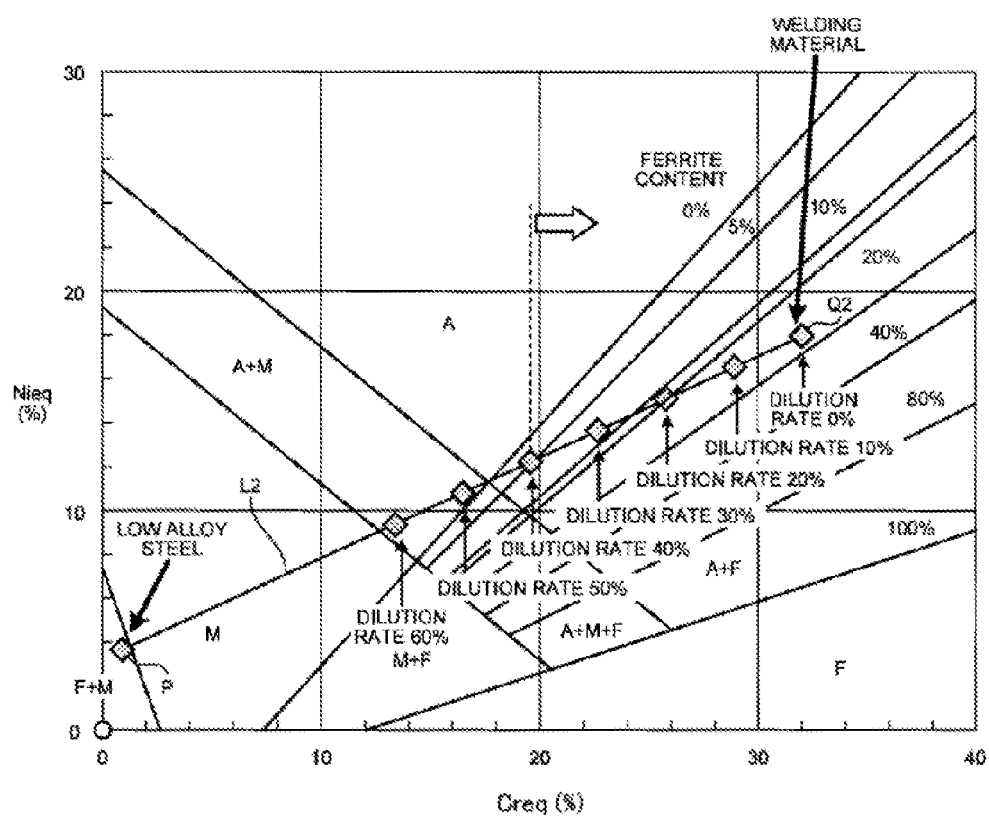
FIG. 10 is a diagram illustrating an example of a Schaeffler's diagram according to the second embodiment.

FIG. 10 illustrates an example in which the dilution rate of the weld metal 3 which is generated by the prescribed heat input is measured and the composition of the welding material 2 is adjusted such that the ferrite content reaches the target ferrite content (target value) based on the measured dilution rate. In the following description, the welding material 2 of which the composition is adjusted based on the measured dilution rate and the target ferrite content is referred to as an improved welding material 2. In FIG. 10, a line L2 is a line connecting a point P indicating the composition of the low alloy steel as the base material 1 to a point Q2 indicating the composition of the austenitic stainless steel as the improved welding material 2. The composition of the weld metal 3 which is formed by welding the base material 1 and the improved welding material 2 is present on the line L2. The point indicating the composition of the weld metal 3 moves along the line L2 with the variation in dilution rate. When the dilution rate is low, the composition of the weld metal 3 gets close to the composition of the improved welding material 2. When the dilution rate is high, the composition of the weld metal 3 gets close to the composition of the base material 1.

In FIG. 10, the chromium equivalent of the improved welding material 2 (the weld metal 3 at a dilution rate of 0%) is about 32%, and the nickel equivalent is about 18%. From Expression (3), at a dilution rate of 10%, the chromium equivalent of the weld metal 3 of the first layer is about 28.8% and the nickel equivalent is about 16.2%. At a dilution rate of 40%, the chromium equivalent of the first layer is about 19.2% and the nickel equivalent is about 10.8%.

In FIG. 10, it can be seen that the ferrite content in the weld metal 3 is about 5% even at a dilution rate of 40%. Accordingly, when the welding is performed using the improved welding material 2 having the composition illustrated in FIG. 10, the dilution rate is allowed up to 40% in order to achieve the above-mentioned target value of ferrite content (from 5% to 12%). In other words, even when the welding is performed with a small heat input (prescribed heat input), it is possible to achieve the target ferrite content of the weld metal 3 using the improved welding material 2 illustrated in FIG. 10.

As described above, according to this embodiment, the weld metal 3 including the target ferrite content is generated by performing the welding using the welding material (improved welding material) 2 having the composition determined based on the measured dilution rate and the target ferrite content of the weld metal 3. Accordingly, it is possible to suppress a decrease in ductility of the weld metal 3 and to suppress generation of a weld defect.

Third Embodiment

A third embodiment will be described below. In the following description, elements equal or equivalent to those of the above-mentioned embodiments will be referenced by the same reference signs and description thereof will be described in brief or omitted. This embodiment is a modified example of the above-mentioned second embodiment.

Figure 11:
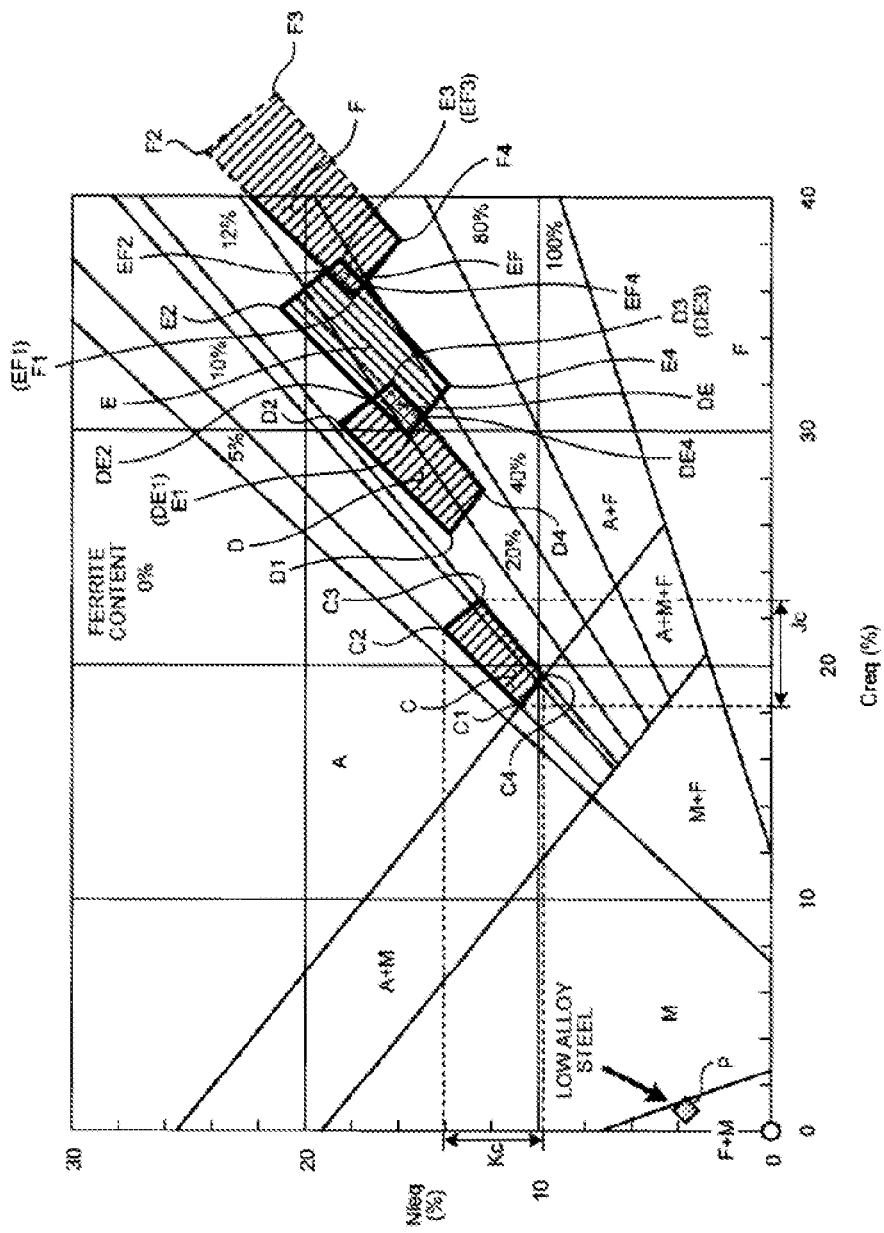
FIG. 11 is a diagram illustrating an example of a Schaeffler's diagram according to a third embodiment.

FIG. 11 illustrates an example of the Schaeffler's diagram which is used to determine the composition of the welding material 2 according to this embodiment. In FIG. 11, an area C indicates a composition range of the weld metal 3 in which the target ferrite content is achieved. The area C is defined by the chromium equivalent in a numerical range Jc and the nickel equivalent in a numerical range Kc. The area C has four corners (points). The first point C1 indicates a composition having a smallest chromium equivalent among the compositions of the weld metal 3 in which the target ferrite content is achieved. The second point C2 indicates a composition having a largest nickel equivalent among the compositions of the weld metal 3 in which the target ferrite content is achieved. The third point C3 indicates a composition having a largest chromium equivalent among the compositions of the weld metal 3 in which the target ferrite content is achieved. The fourth point C4 indicates a composition having a smallest nickel equivalent among the compositions of the weld metal 3 in which the target ferrite content is achieved.

For example, the composition of the point C1 includes a chromium equivalent of 18.3% and a nickel equivalent of 10.8%. The composition of the point C2 includes a chromium equivalent of 21.5% and a nickel equivalent of 14.1%. The composition of the point C3 includes a chromium equivalent of 22.8% and a nickel equivalent of 12.6%. The composition of the point C4 includes a chromium equivalent of 19.5% and a nickel equivalent of 9.8%.

In FIG. 11, an area D indicates a composition range of the welding material 2 in which the target ferrite content can be achieved at a dilution rate of 30%. The area D is defined by the chromium equivalent in a numerical range Jd and the nickel equivalent in a numerical range Kd. The area D has four corners (points). The first point D1 indicates a composition having a smallest chromium equivalent among the compositions of the welding material 2 in which the target ferrite content can be achieved. The second point D2 indicates a composition having a largest nickel equivalent among the compositions of the welding material 2 in which the target ferrite content can be achieved. The third point D3 indicates a composition having a largest chromium equivalent among the compositions of the welding material 2 in which the target ferrite content can be achieved. The fourth point D4 indicates a composition having a smallest nickel equivalent among the compositions of the welding material 2 in which the target ferrite content can be achieved.

For example, the composition of the point D1 includes a chromium equivalent of 25.7% and a nickel equivalent of 13.9%. The composition of the point D2 includes a chromium equivalent of 30.3% and a nickel equivalent of 18.5%. The composition of the point D3 includes a chromium equivalent of 32.2% and a nickel equivalent of 16.4%. The composition of the point D4 includes a chromium equivalent of 27.5% and a nickel equivalent of 12.5%.

For example, when the dilution rate is 30% and the weld metal 3 has the composition indicated by the point C1, the welding material 2 is determined to have the composition indicated by the point D1. When the weld metal 3 has the composition indicated by the point C2, the welding material 2 is determined to have the composition indicated by the point D2. When the weld metal 3 has the composition indicated by the point C3, the welding material 2 is determined to have the composition indicated by the point D3. When the weld metal 3 has the composition indicated by the point C4, the welding material 2 is determined to have the composition indicated by the point D4. When the weld metal 3 has the composition indicated by the center point of the area C, the welding material 2 is determined to have the composition indicated by the center point of the area D.

In FIG. 11, an area E indicates a composition range of the welding material 2 in which the target ferrite content can be achieved at a dilution rate of 40%. The area E is defined by the chromium equivalent in a numerical range Je and the nickel equivalent in a numerical range Ke. The area E has four corners (points). The first point E1 indicates a composition having a smallest chromium equivalent among the compositions of the welding material 2 in which the target ferrite content can be achieved. The second point E2 indicates a composition having a largest nickel equivalent among the compositions of the welding material 2 in which the target ferrite content can be achieved. The third point E3 indicates a composition having a largest chromium equivalent among the compositions of the welding material 2 in which the target ferrite content can be achieved. The fourth point E4 indicates a composition having a smallest nickel equivalent among the compositions of the welding material 2 in which the target ferrite content can be achieved.

For example, the composition of the point E1 includes a chromium equivalent of 29.8% and a nickel equivalent of 15.6%. The composition of the point E2 includes a chromium equivalent of 35.2% and a nickel equivalent of 21.0%. The composition of the point E3 includes a chromium equivalent of 37.4% and a nickel equivalent of 18.6%. The composition of the point E4 includes a chromium equivalent of 31.9% and a nickel equivalent of 13.9%.

For example, when the dilution rate is 40% and the weld metal 3 has the composition indicated by the point C1, the welding material 2 is determined to have the composition indicated by the point E1. When the weld metal 3 has the composition indicated by the point C2, the welding material 2 is determined to have the composition indicated by the point E2. When the weld metal 3 has the composition indicated by the point C3, the welding material 2 is determined to have the composition indicated by the point E3. When the weld metal 3 has the composition indicated by the point C4, the welding material 2 is determined to have the composition indicated by the point E4. When the weld metal 3 has the composition indicated by the center point of the area C, the welding material 2 is determined to have the composition indicated by the center point of the area E.

In FIG. 11, an area F indicates a composition range of the welding material 2 in which the target ferrite content can be achieved at a dilution rate of 50%. The area F is defined by the chromium equivalent in a numerical range Jf and the nickel equivalent in a numerical range Kf. The area F has four corners (points). The first point F1 indicates a composition having a smallest chromium equivalent among the compositions of the welding material 2 in which the target ferrite content can be achieved. The second point F2 indicates a composition having a largest nickel equivalent among the compositions of the welding material 2 in which the target ferrite content can be achieved. The third point F3 indicates a composition having a largest chromium equivalent among the compositions of the welding material 2 in which the target ferrite content can be achieved. The fourth point F4 indicates a composition having a smallest nickel equivalent among the compositions of the welding material 2 in which the target ferrite content can be achieved.

For example, the composition of the point F1 includes a chromium equivalent of 35.6% and a nickel equivalent of 18.0%. The composition of the point F2 includes a chromium equivalent of 42.1% and a nickel equivalent of 24.5%. The composition of the point F3 includes a chromium equivalent of 44.7% and a nickel equivalent of 21.6%. The composition of the point F4 includes a chromium equivalent of 38.1% and a nickel equivalent of 16.0%.

For example, when the dilution rate is 50% and the weld metal 3 has the composition indicated by the point C1, the welding material 2 is determined to have the composition indicated by the point F1. When the weld metal 3 has the composition indicated by the point C2, the welding material 2 is determined to have the composition indicated by the point F2. When the weld metal 3 has the composition indicated by the point C3, the welding material 2 is determined to have the composition indicated by the point F3. When the weld metal 3 has the composition indicated by the point C4, the welding material 2 is determined to have the composition indicated by the point F4. When the weld metal 3 has the composition indicated by the center point of the area C, the welding material 2 is determined to have the composition indicated by the center point of the area F.

In this way, the range C of the target ferrite content of the weld metal 3 which is defined by the chromium equivalent in the numerical range Jc and the nickel equivalent in the numerical range Kc may be set, the composition range D (E, F) of the welding material 2 which is defined by the chromium equivalent in the numerical range Jd (Je, Jf) and the nickel equivalent in the numerical range Kd (Ke, Kf) may be determined so as to generate the weld metal 3 including a target ferrite content in the range C at a predetermined dilution rate of 30% (40%, 50%), the heat input may be determined to achieve a predetermined dilution rate, and the base material 1 may be welded using the welding material 2 having a composition in the range D (E, F) with the determined heat input.

In FIG. 11, an area DE is an overlap area of the area D and the area E. That is, the area DE indicates a composition range of the welding material 2 in which the target ferrite content can be achieved at a dilution rate of 30% to 40%. The area DE has four corners (points). The first point DE1 indicates a composition having a smallest chromium equivalent among the compositions of the welding material 2 in which the target ferrite content can be achieved, and corresponds to the above-mentioned point E1. The second point DE2 indicates a composition having a largest nickel equivalent among the compositions of the welding material 2 in which the target ferrite content can be achieved. The third point DE3 indicates a composition having a largest chromium equivalent among the compositions of the welding material 2 in which the target ferrite content can be achieved, and corresponds to the above-mentioned point D3. The fourth point DE4 indicates a composition having a smallest nickel equivalent among the compositions of the welding material 2 in which the target ferrite content can be achieved.

For example, the composition of the point DE1 includes a chromium equivalent of 29.8% and a nickel equivalent of 15.6%. The composition of the point DE2 includes a chromium equivalent of 31.5% and a nickel equivalent of 17.2%. The composition of the point DE3 includes a chromium equivalent of 32.2% and a nickel equivalent of 16.4%. The composition of the point DE4 includes a chromium equivalent of 30.5% and a nickel equivalent of 15.0%.

In FIG. 11, an area EF is an overlap area of the area E and the area F. That is, the area EF indicates a composition range of the welding material 2 in which the target ferrite content can be achieved at a dilution rate of 40% to 50%. The area EF has four corners (points). The first point EF1 indicates a composition having a smallest chromium equivalent among the compositions of the welding material 2 in which the target ferrite content can be achieved, and corresponds to the above-mentioned point F1. The second point EF2 indicates a composition having a largest nickel equivalent among the compositions of the welding material 2 in which the target ferrite content can be achieved. The third point EF3 indicates a composition having a largest chromium equivalent among the compositions of the welding material 2 in which the target ferrite content can be achieved, and corresponds to the above-mentioned point E3. The fourth point EF4 indicates a composition having a smallest nickel equivalent among the compositions of the welding material 2 in which the target ferrite content can be achieved.

For example, the composition of the point EF1 includes a chromium equivalent of 35.6% and a nickel equivalent of 18.0%. The composition of the point EF2 includes a chromium equivalent of 36.8% and a nickel equivalent of 19.2%. The composition of the point EF3 includes a chromium equivalent of 37.4% and a nickel equivalent of 18.6%. The composition of the point EF4 includes a chromium equivalent of 36.2% and a nickel equivalent of 17.5%.

Figure 12:
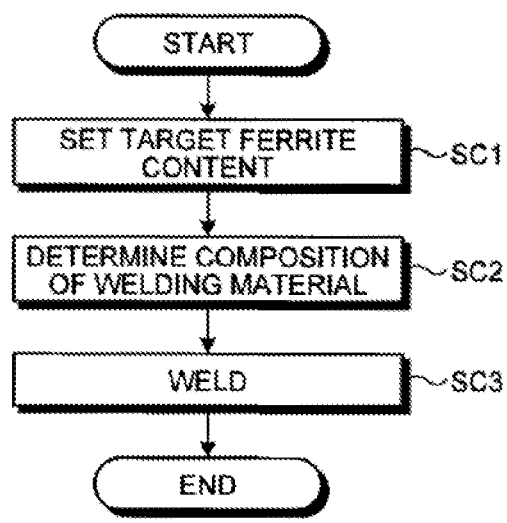
FIG. 12 is a flowchart illustrating an example of a welding method according to the third embodiment.

FIG. 12 is a flowchart illustrating an example of the welding method according to this embodiment. The welding method according to this embodiment includes a step (step SC1) of setting a target ferrite content in the weld metal 3, a step (step SC2) of determining the composition of the welding material 2 so as to generate the weld metal 3 including the target ferrite content at both a first dilution rate of the weld metal 3 and a second dilution rate other than the first dilution rate, and a step (step SC3) of setting a heat input to achieve a dilution rate between the first dilution rate and the second dilution rate and welding the base material 1 using the welding material 2 having the determined composition.

Figure 13:
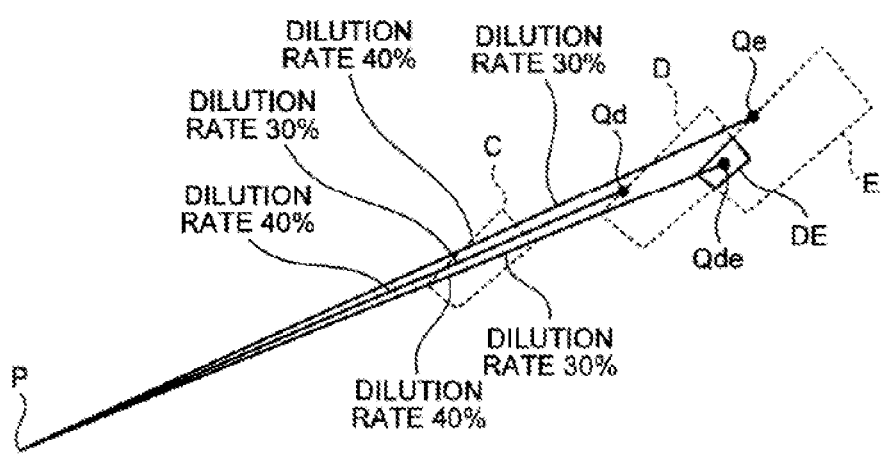
FIG. 13 is an enlarged view schematically illustrating a part of FIG. 11.

FIG. 13 is a diagram schematically illustrating a part of FIG. 11. In FIG. 13, a point P is a point indicating the composition of the base material 1. A point Qd is a point indicating the composition of the welding material 2 in which the target ferrite content can be achieved at a dilution rate of 30%. The point Qd is located in the area C. A point Qe is a point indicating the composition of the welding material 2 in which the target ferrite content can be achieved at a dilution rate of 40%. The point Qe is located in the area E. A point Qde is a point indicating the composition of the welding material 2 in which the target ferrite content can be achieved at a dilution rate of 30% to 40%. The point Qde is located in the area DE.

As illustrated in FIG. 13, when the dilution rate of the weld metal 3 which is generated by the welding material 2 having the composition indicated by the point Qd and the base material 1 is 30%, the point indicating the composition is located inside the area C and can achieve the target ferrite content. On the other hand, when the dilution rate is 40%, the point indicating the composition is located outside the area C and cannot achieve the target ferrite content.

As illustrated in FIG. 13, when the dilution rate of the weld metal 3 which is generated by the welding material 2 having the composition indicated by the point Qe and the base material 1 is 40%, the point indicating the composition is located inside the area C and can achieve the target ferrite content. On the other hand, when the dilution rate is 30%, the point indicating the composition is located outside the area C and cannot achieve the target ferrite content.

As illustrated in FIG. 13, when the dilution rate of the weld metal 3 which is generated by the welding material 2 having the composition indicated by the point Qde and the base material 1 is 30% and 40%, the point indicating the composition is located inside the area C and can achieve the target ferrite content.

In this embodiment, the target ferrite content (area C) of the weld metal 3 is set (step SC1), and the composition of the welding material 2 is determined to generate the weld metal 3 including the target ferrite content at both a dilution rate of 30% and a dilution rate of 40% (step SC2). That is, in step SC2, the composition of the welding material 2 is determined such that the point indicating the composition of the welding material 2 is located inside the area DE. Then, the heat input is set such that the dilution rate ranges from 30% to 40%, and the base material 1 is welded using the welding material 2 based on the set heat input (step SC3).

As described above, in this embodiment, since the weld metal 2 including the target ferrite content is generated, it is possible to suppress generation of a weld defect. According to this embodiment, even when the dilution rate varies between 30% and 40% in welding, the weld metal 3 including the target ferrite content is generated and it is thus possible to suppress generation of a weld defect.

In this embodiment, an example has been described above in which the composition of the welding material 2 is determined to generate the weld metal 3 including the target ferrite content when the dilution rate ranges from 30% to 40%. When the composition of the welding material 2 is determined to generate the weld metal 3 including the target ferrite content when the dilution rate ranges from 40% to 50%, the composition of the welding material 2 is determined such that the point indicating the composition of the welding material 2 is located inside the area EF.

Fourth Embodiment

A fourth embodiment will be described below. In the following description, elements equal or equivalent to those of the above-mentioned embodiments will be referenced by the same reference signs and description thereof will be described in brief or omitted.

Figure 14:
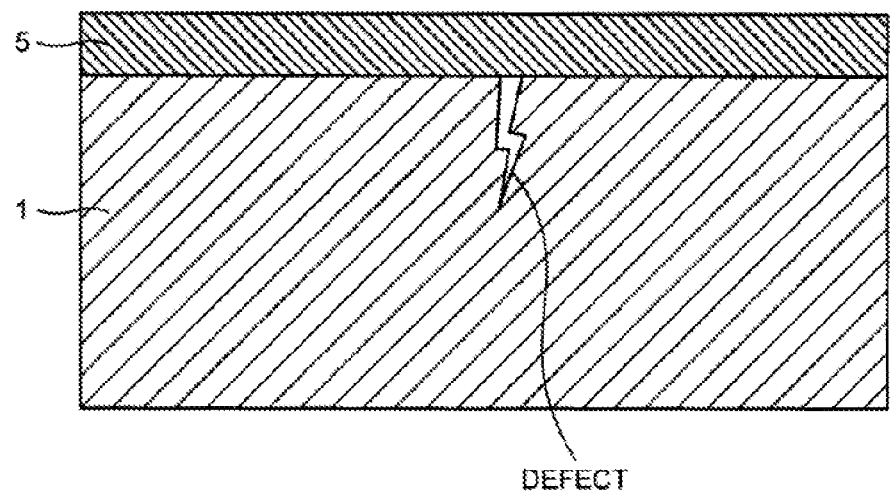
FIG. 14 is a diagram illustrating an example of a repairing method according to a fourth embodiment.
Figure 15:
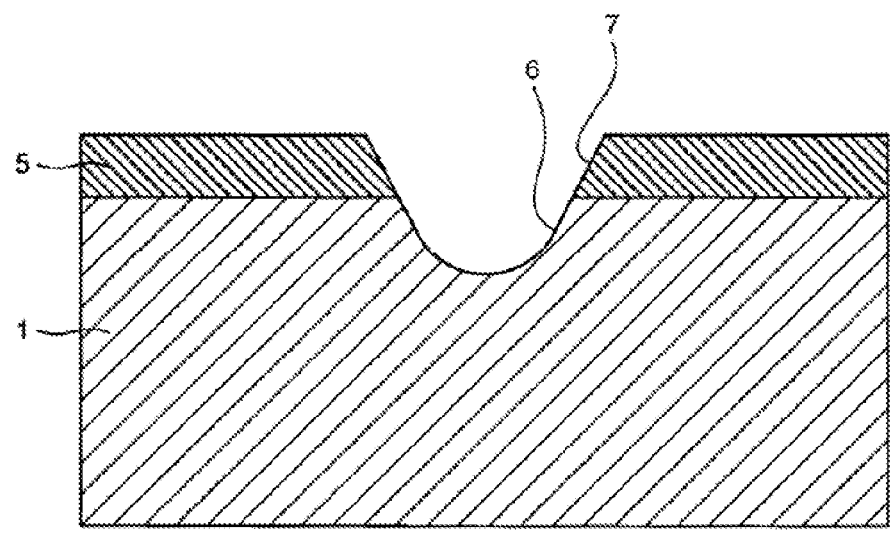
FIG. 15 is a diagram illustrating an example of the repairing method according to the fourth embodiment.
Figure 16:
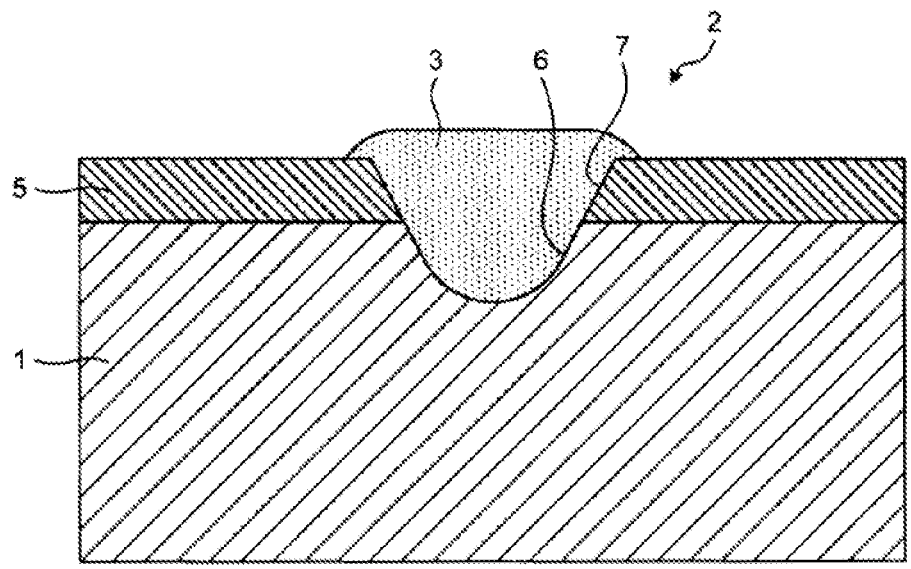
FIG. 16 is a diagram illustrating an example of the repairing method according to the fourth embodiment.

FIGS. 14, 15, and 16 are schematic diagrams illustrating an example of a repairing method according to this embodiment. As illustrated in FIG. 14, in this embodiment, a clad layer 5 is formed on the surface of the base material 1. In this embodiment, the clad layer 5 is formed of austenitic stainless steel. In this embodiment, an example in which a defect generated in the base material 1 is repaired as illustrated in FIG. 14.

As illustrated in FIG. 15, a part of the base material 1 including a defect is removed. A part of the clad layer 5 is also removed in removing a part of the base material 1. In this embodiment, a part of the base material 1 and a part of the clad layer 5 are removed by cutting. A depressed portion 6 is formed in the base material 1 by removing a part of the base material 1. An opening 7 is formed in the clad layer 5 by removing a part of the clad layer 5.

Then, welding for repairing is performed. The base material 1 and the clad layer 5 are welded. The welding of the base material 1 includes a process of welding the depressed portion 6 and filling up the depressed portion 6 with the weld metal 3. The welding of the clad layer 5 includes a process of welding the opening 7 and filling up the opening 7 with the weld metal 3. According to the above-mentioned embodiment, the base material 1 and the clad layer 5 are welded using the welding material 2. In this embodiment, buttered welding may be performed to fill up the depressed portion 6 and the opening 7 with the weld metal 3. Accordingly, as illustrated in FIG. 16, the depressed portion 6 and the opening 7 are filled with the weld metal 3 to form a robust weld zone 2.

The depressed portion 6 and the opening 7 are welded by laser welding in which the heat input is sufficiently reduced. Accordingly, it is possible to suppress generation of a weld defect. In this embodiment, the laser power in the laser welding is determined to range from 720 W to 880 W. When the laser power is less than 720 W, there is a possibility that it will be difficult to add the welding material 2. When the laser power is greater than 880 W, there is a high possibility that the heat input will increase and a weld defect will be generated. The welding speed in the laser welding is determined to range from 12.1 mm/sec to 14.6 mm/sec. When the welding speed is higher than 14.6 mm sec, there is a possibility that it will be difficult to add the welding material 2. When the welding speed is lower than 12.1 mm/sec, there is a high possibility that the heat input will increase and a weld defect will be generated.

As described above, according to this embodiment, even when the clad layer 5 is formed on the surface of the base material 1, it is possible to repair a defect of the base material 1 well.

Fifth Embodiment

A fifth embodiment will be described below. In the following description, elements equal or equivalent to those of the above-mentioned embodiments will be referenced by the same reference signs and description thereof will be described in brief or omitted.

Figure 17:
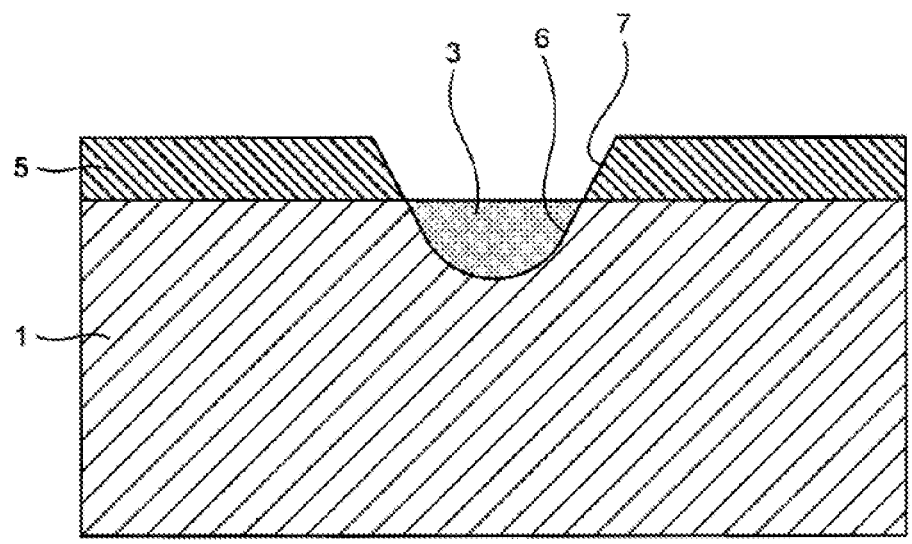
FIG. 17 is a diagram illustrating an example of a repairing method according to a fifth embodiment.

FIGS. 17 and 10 are schematic diagrams illustrating an example of a repairing method according to this embodiment. As in the above-mentioned embodiment, a part of the base material 1 and a part of the clad layer 5 which include a defect are removed. Accordingly, as illustrated in FIG. 15, a depressed portion 6 and an opening 7 are formed. After the depressed portion 6 and the opening 7 are formed, the depressed portion 6 is welded such that the weld metal 3 does not come in contact with the clad layer 5 as illustrated in FIG. 17. The welding of the depressed portion 6 includes a process of filling up the depressed portion 6 with the weld metal 3. In this embodiment, the welding of the depressed portion 6 is performed by TIG welding with a heat input H1.

Figure 18:
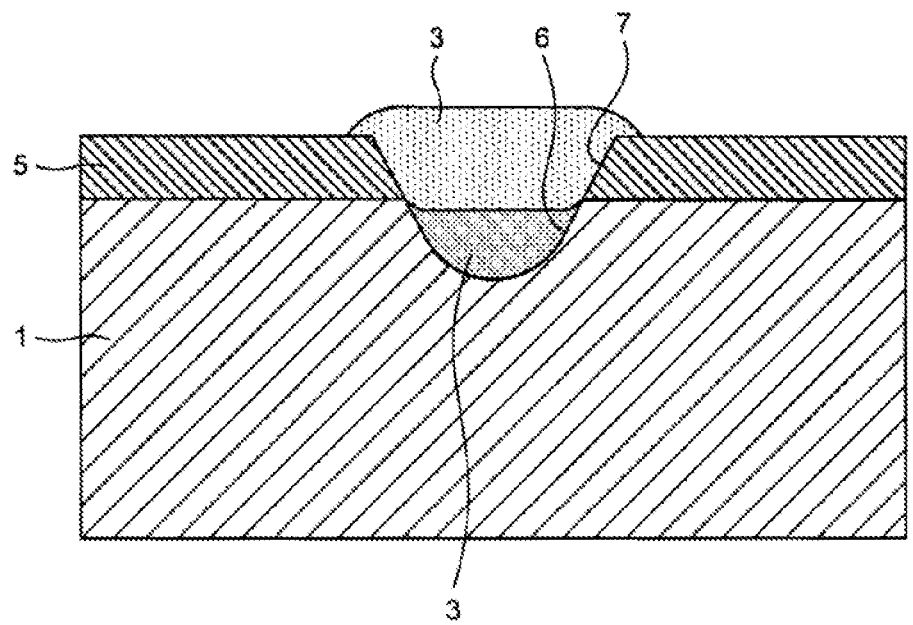
FIG. 18 is a diagram illustrating an example of the repairing method according to the fifth embodiment.

After the depressed portion 6 is welded, the opening 7 is welded as illustrated in FIG. 18. The welding of the opening 7 includes a process of filling up the opening 7 with the weld metal 3. In this embodiment, the welding of the opening 7 is performed by laser welding with a heat input H2 which is smaller than the heat input H1.

As described above, according to this embodiment, it is possible to suppress generation of a weld defect and to shorten a welding operation time. The clad layer 5 is formed on the surface of the base material 1 by welding and thus includes a heat-affected zone. There is a possibility that the clad layer 5 will include helium due to irradiation with neutrons. Accordingly, when the welding material 2 (weld metal 3) comes in contact with the clad layer 5, there is a possibility that a weld defect such as a split will be generated. By welding the opening 7 of the clad layer 5 with the heat input H2 which is smaller than the heat input H1, it is possible to suppress generation of a weld defect. By welding the depressed portion 6 of the base material 1 with the heat input H1 which is greater than the heat input H2, it is possible to shorten a welding operation time.

Sixth Embodiment

A sixth embodiment will be described below. In the following description, elements equal or equivalent to those of the above-mentioned embodiments will be referenced by the same reference signs and description thereof will be described in brief or omitted.

Figure 19:
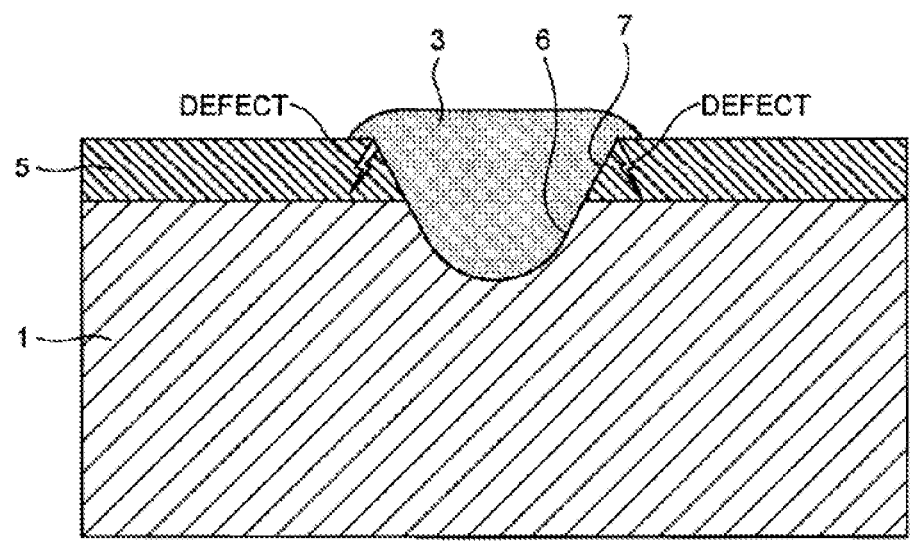
FIG. 19 is a diagram illustrating an example of a repairing method according to a sixth embodiment.
Figure 20:
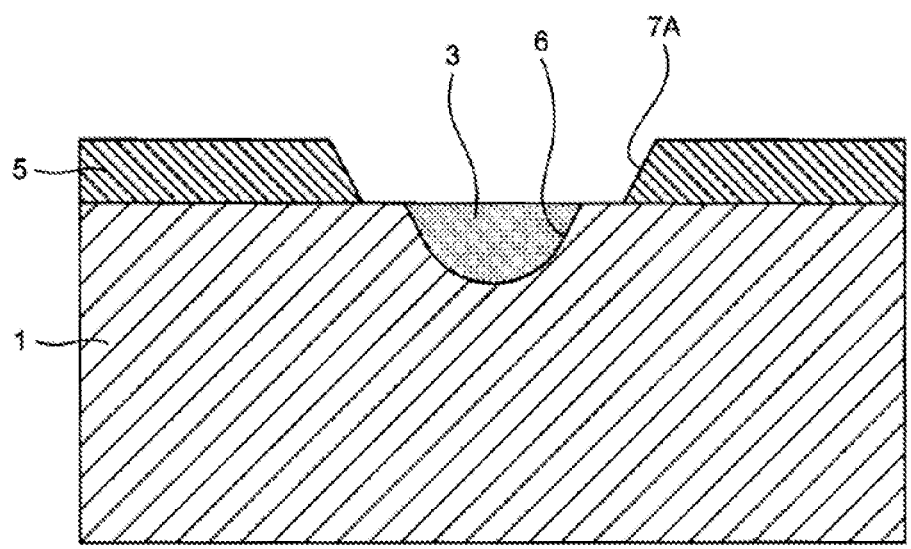
FIG. 20 is a diagram illustrating an example of the repairing method according to the sixth embodiment.
Figure 21:
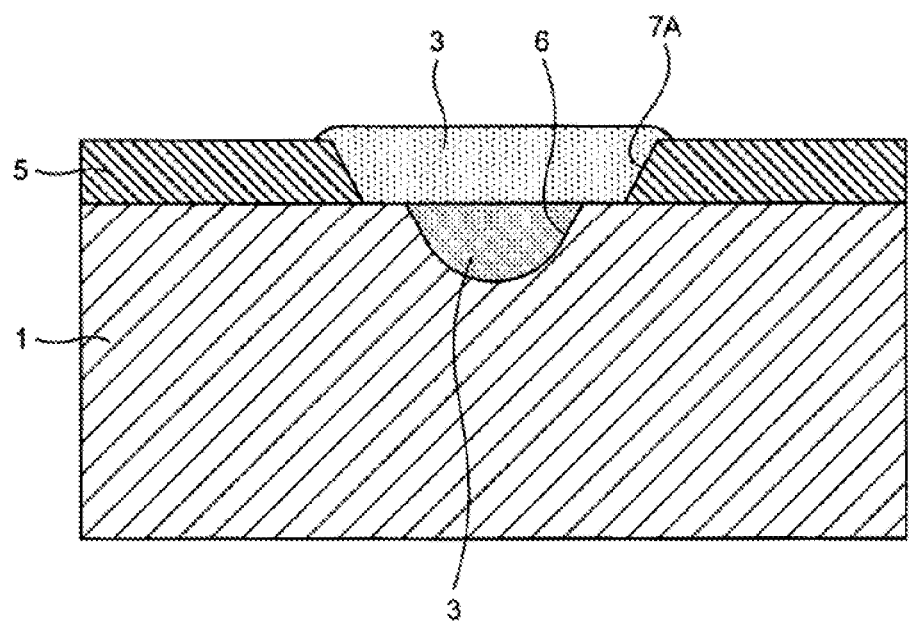
FIG. 21 is a diagram illustrating an example of the repairing method according to the sixth embodiment.

FIGS. 19, 20, and 21 are schematic diagrams illustrating an example of a repairing method according to this embodiment. As in the above-mentioned embodiment, a part of the base material 1 and a part of the clad layer 5 which include a defect are removed. Accordingly, as illustrated in FIG. 15, a depressed portion 6 and an opening 7 are formed. In this embodiment, the depressed portion 6 and the opening 7 are welded by TIG welding with a heat input H1.

The clad layer 5 includes a heat-affected zone. There is a possibility that the clad layer 5 will include helium due to irradiation with neutrons. Accordingly, when the opening 7 of the clad layer 5 is welded with the heat input H1, there is a possibility that a weld defect such as a split will be generated in a part of the clad layer 5 around the opening 7 as illustrated in FIG. 19.

After the welding of the depressed portion 6 and the welding of the opening 7 are performed, the weld metal 3 inside the opening 7 and a part of the clad layer 5 around the opening 7 are removed in a state in which the weld metal 3 in the depressed portion 6 remains as illustrated in FIG. 20. By removing a part of the clad layer 5 around the opening 7, an opening 7A which is larger than the opening 7 is formed in the clad layer 5 as illustrated in FIG. 20. By removing a part of the clad layer 5 around the opening 7, the weld defect is also removed along with a part of the clad layer 5.

After the opening 7A is formed in the clad layer 5, the opening 7A is welded as illustrated in FIG. 21. The welding of the opening 7A is performed by laser welding with a heat input H2 which is smaller than the heat input H1.

As described above, according to this embodiment, it is possible to shorten a welding operation time by welding the depressed portion 6 and the opening 7 with the heat input H1 which is larger than the heat input H2. Even when a weld defect is generated in the clad layer 5 around the opening 7, it is possible to suppress generation of a weld defect by removing a part of the clad layer 5 including the weld defect to form the opening 7A and then welding the opening 7A with the heat input H2 which is smaller than the heat input H1.

Seventh Embodiment

A seventh embodiment will be described below. In the following description, elements equal or equivalent to those of the above-mentioned embodiments will be referenced by the same reference signs and description thereof will be described in brief or omitted.

Figure 22:
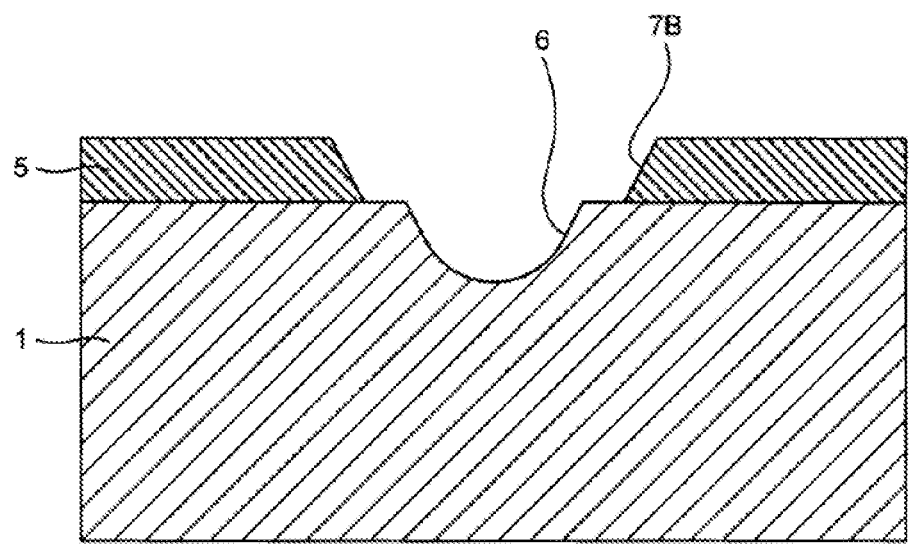
FIG. 22 is a diagram illustrating an example of a repairing method according to a seventh embodiment.

FIGS. 22, 23, 24, and 25 are schematic diagrams illustrating an example of a repairing method according to this embodiment. A part of the base material 1 and a part of the clad layer 5 which include a defect are removed. Accordingly, as illustrated in FIG. 22, a depressed portion 6 and an opening 7B are formed. The opening 7B is larger than the opening at the top end of the depressed portion 6.

Figure 23:
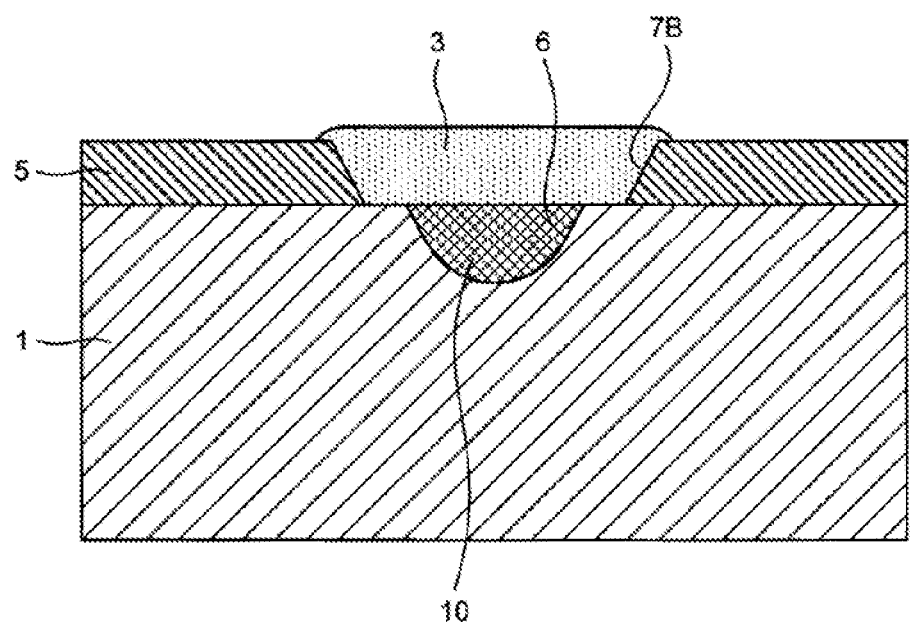
FIG. 23 is a diagram illustrating an example of the repairing method according to the seventh embodiment.

In this embodiment, after the depressed portion 6 and the opening 7B are formed and before the welding of the depressed portion 6 and the welding of the opening 7B are performed, a plug member 10 is disposed in the depressed portion 6. As illustrated in FIG. 23, the opening 7B is welded in a state in which the plug member 10 is disposed in the depressed portion 6. The welding of the opening 7B is performed by laser welding with a heat input H2 which is smaller than a heat input H1.

Figure 24:
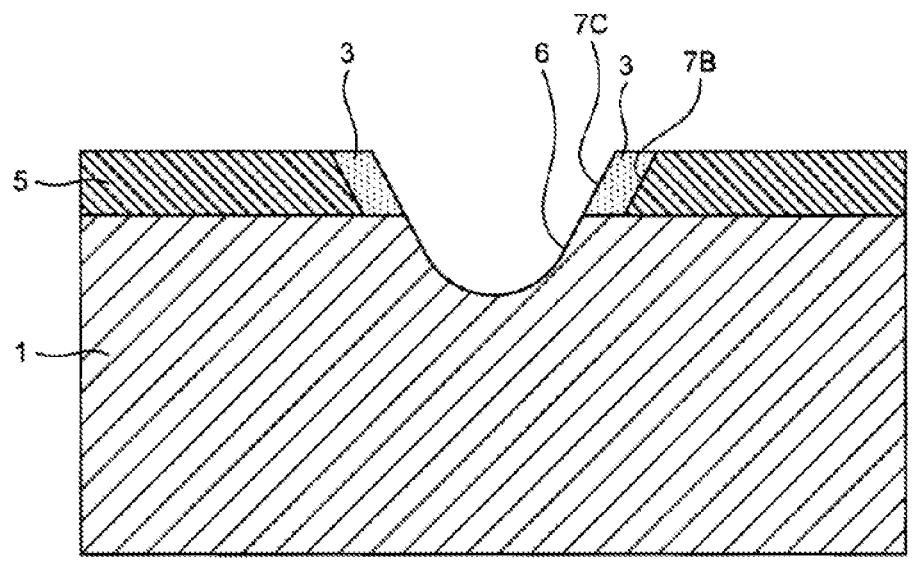
FIG. 24 is a diagram illustrating an example of the repairing method according to the seventh embodiment.
Figure 25:
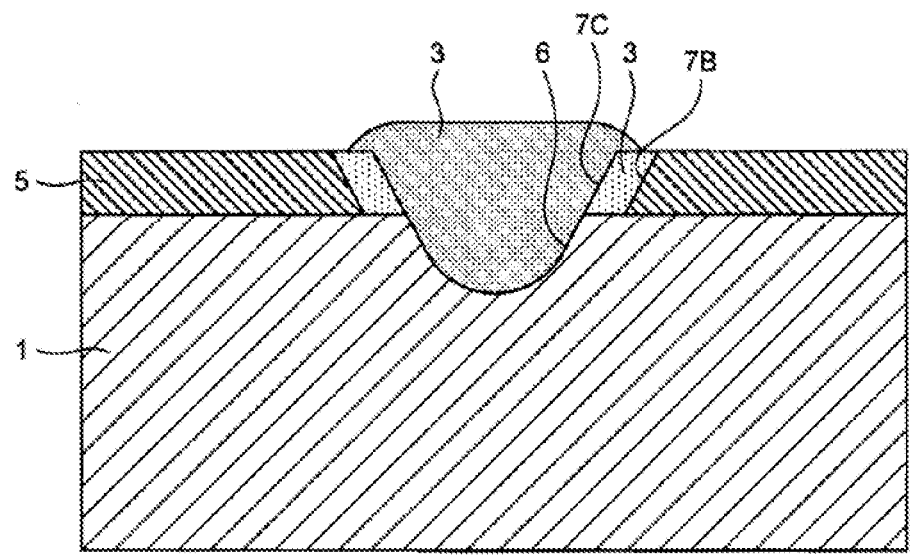
FIG. 25 is a diagram illustrating an example of the repairing method according to the seventh embodiment.

After the opening 7B is welded, a part of the weld metal 3 inside the opening 7B is removed. Accordingly, as illustrated in FIG. 24, an opening 7C is formed in the weld metal 3. The opening 7C is smaller than the opening 7B. The plug member 10 is removed from the depressed portion 6.

After the opening 7C is formed and the plug member 10 is removed from the depressed portion 6, the depressed portion 6 and the opening 7C are respectively welded. The welding of the depressed portion 6 and the opening 7C is performed by TIG welding with the heat input H1 which is larger than the heat input H2.

As described above, according to this embodiment, it is possible to suppress generation of a weld defect and to shorten a welding operation time. In this embodiment, by welding the opening 7B of the clad layer 5 with the heat input H2 which is smaller than the heat input H1, it is possible to suppress generation of a weld defect. In welding the opening 7B, since the plug member 10 is disposed in the depressed portion 6, the opening 7B is welded but the depressed portion 6 is not welded. Accordingly, it is possible to shorten a welding operation time. By forming the opening 7C in the weld metal 3 after welding the opening 7B, it is possible to smoothly remove the plug member 10 via the opening 7C. The weld metal 3 which defines the opening 7C is a robust weld zone in which generation of a weld defect is suppressed. By welding the depressed portion 6 and the opening 7C with the heat input H1 which is larger than the heat input H2 after the opening 7C is formed and the plug member 10 is removed, it is possible to perform robust welding in a short time.

Eighth Embodiment

An eighth embodiment will be described below. In the following description, elements equal or equivalent to those of the above-mentioned embodiments will be referenced by the same reference signs and description thereof will be described in brief or omitted.

Figure 26:
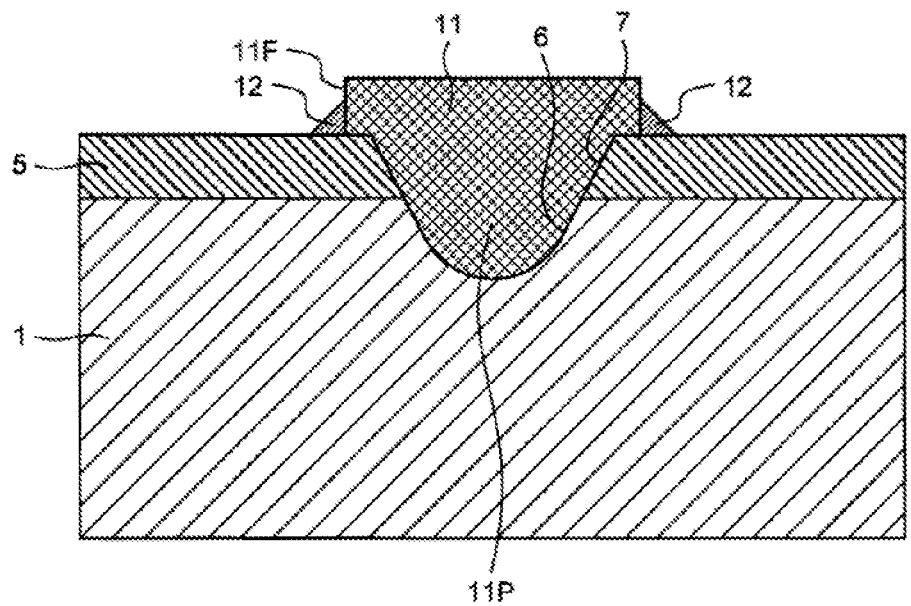
FIG. 26 is a diagram illustrating an example of a repairing method according to an eighth embodiment.

FIG. 26 is a schematic diagram illustrating an example of a repairing method according to this embodiment. As in the above-mentioned embodiment, a part of the base material 1 and a part of the clad layer 5 which include a defect are removed. Accordingly, as illustrated in FIG. 15, a depressed portion 6 and an opening 7 are formed.

In this embodiment, after the depressed portion 6 and the opening 7 are formed and before the welding thereof is performed, the opening 7 is covered with a cover member 11 as illustrated in FIG. 26. In this embodiment, the cover member 11 includes austenitic stainless steel, and the cover member 11 and at least a part of the clad layer 5 are welded using the welding material 2.

In this embodiment, the cover member 11 includes a plug portion 11P which is disposed in the depressed portion 6 and the opening 7 and a flange portion 11F which is disposed to protrude from the surface of the clad layer 5.

Figure 27:
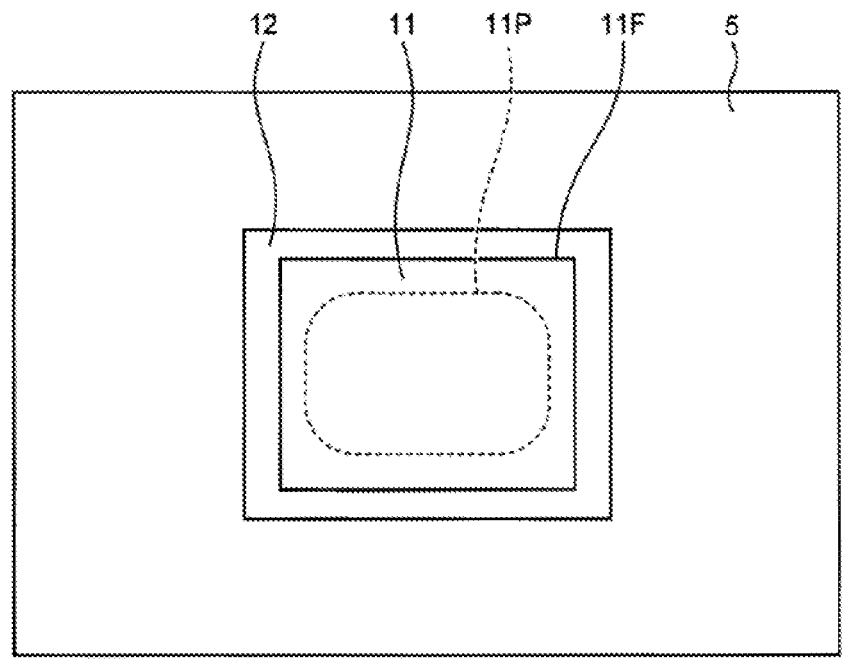
FIG. 27 is a diagram illustrating an example of the repairing method according to the eighth embodiment.

FIG. 27 is a plan view illustrating an example of the cover member 11 which is disposed in the depressed portion 6 and the opening 7. As illustrated in FIGS. 26 and 27, in this embodiment, the flange portion 11F is joined to the clad layer 5 by fillet welding. The weld zone 12 due to the fillet welding is disposed around the flange portion 11F.

As described above, according to this embodiment, by covering the opening 7 with the cover member 11 after the depressed portion 6 and the opening 7 are formed to remove a defect (primary defect) of the base material 1 and before the welding for repairing is performed, it is possible to perform temporary repairing in a short time. For example, when a repairing operation time cannot be secured for a long time, it is possible to perform temporary repairing using the cover member 11. By disposing the cover member 11 to cover the opening 7, for example, a contact of the base material 1 (inner surface of the depressed portion 6) with a primary coolant supplied to the nuclear reactor vessel 101 in activating the nuclear reactor vessel 1 is suppressed. Accordingly, it is possible to suppress corrosion of the base material 1 and to suppress degradation in quality of the base material 1.

Figure 28:
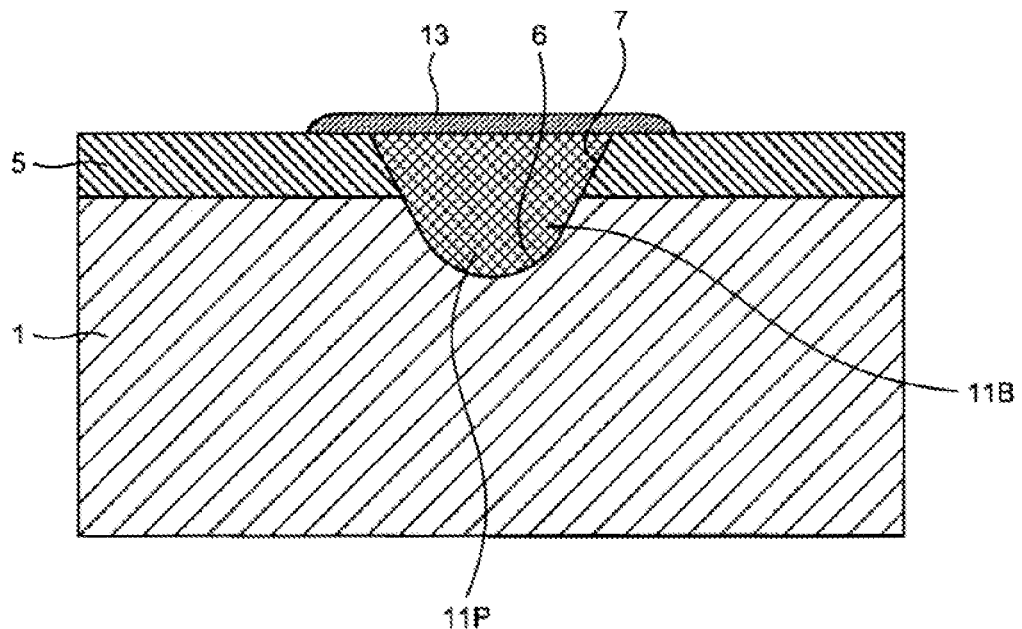
FIG. 28 is a diagram illustrating an example of the repairing method according to the eighth embodiment.
Figure 29:
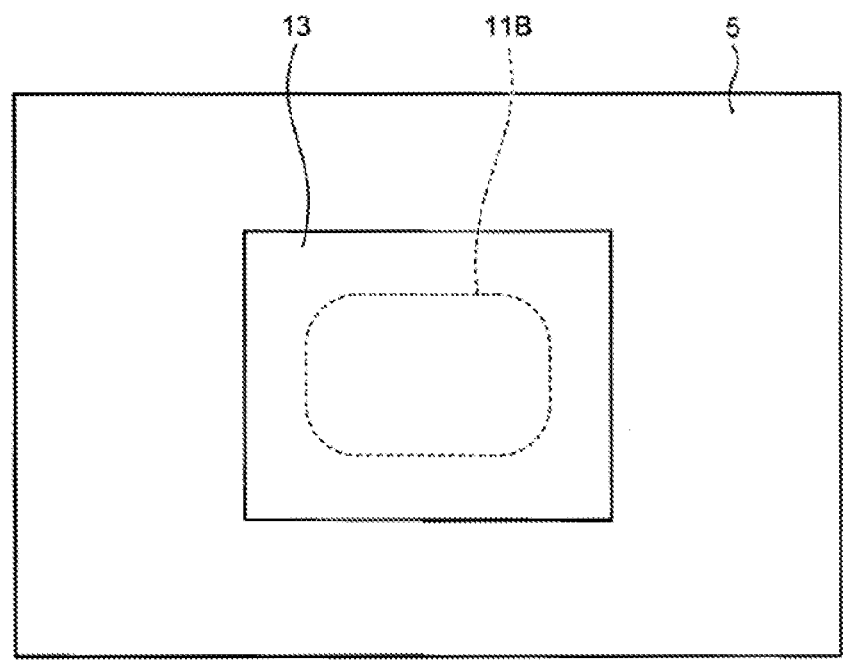
FIG. 29 is a diagram illustrating an example of the repairing method according to the eighth embodiment.

FIGS. 28 and 29 are diagrams illustrating an example of a cover member 11B, where FIG. 28 is a side cross-sectional view and FIG. 29 is a plan view. As illustrated in FIGS. 28 and 29, the cover member 11B includes a plug portion 11P which is disposed in the depressed portion 6 and the opening 7 but does not include a flange portion. The top surface of the cover member 11B is disposed to be flush with the surface of the clad layer 5.

In the example illustrated in FIGS. 28 and 29, the cover member 11B is joined to the clad layer 5 by buttered welding. The weld zone 13 due to the buttered welding is disposed to cover the top surface of the cover member 11B.

Figure 30:
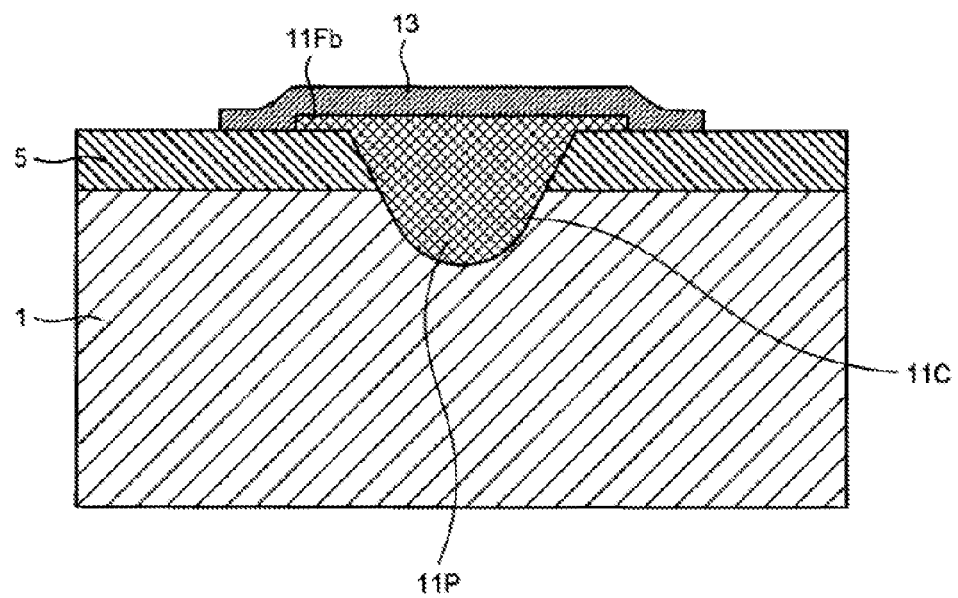
FIG. 30 is a diagram illustrating an example of the repairing method according to the eighth embodiment.

FIG. 30 is a diagram illustrating an example of a cover member 11C. As illustrated in FIG. 30, the cover member 11C includes a plug portion 11P which is disposed in the depressed portion 6 and the opening 7 and a flange portion 11Fb which is disposed to protrude from the surface of the clad layer 5.

In the example illustrated in FIG. 30, the cover member 11C is joined to the clad layer 5 by buttered welding. The weld zone 13 due to the buttered welding is disposed to cover the top surface of the cover member 11C (flange portion 11Fb).

Figure 31:
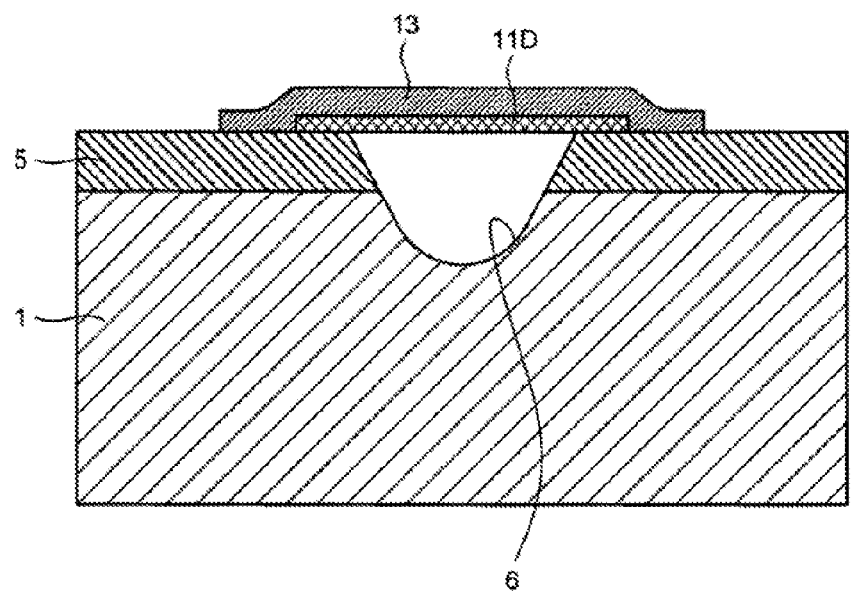
FIG. 31 is a diagram illustrating an example of the repairing method according to the eighth embodiment.

FIG. 31 is a diagram illustrating an example of a cover member 11D. As illustrated in FIG. 31, the cover member 11D has a plate shape and is disposed to cover the opening 7. In the example illustrated in FIG. 31, the cover member D11 is joined to the clad layer 5 by buttered welding. The weld zone 13 due to the buttered welding is disposed to cover the top surface of the cover member 11D.

In the fourth to eighth embodiments, the clad layer 5 is formed on the surface of the base material 1. However, the clad layer 5 may not be formed.

In the above-mentioned embodiments, the base material 1 irradiated with neutrons is welded. However, the base material 1 including low alloy steel not irradiated with neutrons may be welded using the welding material 2 including austenitic stainless steel.

In the above-mentioned embodiments, the nuclear reactor vessel 101 is repaired by welding. A structure other than the nuclear reactor vessel 101 may be repaired according to the above-mentioned embodiments.

In the above-mentioned embodiments, a defect of the base material 1 is repaired by welding. The welding method which has been described in the above-mentioned embodiments may be used for the purpose other than repairing of a defect. For example, a structure may be buttered-welded or may be joint-welding using the welding method which has been described in the above-mentioned embodiments.

In the above-mentioned embodiments, an atomic power generation plant AP includes a pressurized water reactor. The atomic power generation plant AP may include a boiling water reactor (BWR).

REFERENCE SIGNS LIST

1 BASE MATERIAL
2 WELDING MATERIAL
3 WELD METAL
4 WELD ZONE
5 CLAD LAYER
6 DEPRESSED PORTION
7 OPENING
10 PLUG MEMBER
11 COVER MEMBER
101 NUCLEAR REACTOR VESSEL

The invention claimed is:

1. A welding method comprising:
welding, with a welding material of austenitic stainless steel, a base material of low alloy steel which is irradiated with neutrons during which a nuclear reactor vessel is activated;
generating a weld metal of the base material and the welding material by the welding;
setting a range of a target ferrite content of the weld metal, the range being defined by a chromium equivalent in a first numerical range and a nickel equivalent in a second numerical range;
determining a range of composition of the welding material so as to generate the weld metal having a composition in a range of the target ferrite content at a first dilution rate of the weld metal and a second dilution rate other than the first dilution rate the range of the composition of the welding material being defined by a chromium equivalent in a third numerical range and a nickel equivalent in a fourth numerical range; and
setting a heat input to achieve a dilution rate between the first dilution rate and the second dilution rate and welding the base material with the welding material having the determined composition.

2. The welding method according to claim 1, wherein the target ferrite content of the weld metal ranges from 5% to 12%.

* * * * *